(12) United States Patent
Suese

(10) Patent No.: US 8,854,639 B2
(45) Date of Patent: Oct. 7, 2014

(54) CONTROL DEVICE, IMAGE FORMING APPARATUS, AND READING DEVICE

(75) Inventor: Narihiko Suese, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 743 days.

(21) Appl. No.: 12/976,072

(22) Filed: Dec. 22, 2010

(65) Prior Publication Data

US 2011/0181900 A1    Jul. 28, 2011

(30) Foreign Application Priority Data

Jan. 27, 2010    (JP) ................................. 2010-015356
Jan. 29, 2010    (JP) ................................. 2010-019249

(51) Int. Cl.
*G06F 3/14*    (2006.01)
*H04N 1/00*    (2006.01)
*G03G 15/00*    (2006.01)

(52) U.S. Cl.
CPC ......... *H04N 1/00949* (2013.01); *H04N 1/0074* (2013.01); *H04N 1/00957* (2013.01); *H04N 1/00482* (2013.01); *G03G 15/502* (2013.01); *H04N 1/00413* (2013.01); *H04N 1/00687* (2013.01)

USPC .......................... 358/1.13; 358/500; 358/1.15

(58) Field of Classification Search
CPC ............ G03G 15/502; H04N 1/00413; H04N 1/00482
See application file for complete search history.

(56) References Cited

U.S. PATENT DOCUMENTS

| | | |
|---|---|---|
| 2005/0179960 A1 | 8/2005 | Obana et al. |
| 2007/0200856 A1 | 8/2007 | Tashiro |
| 2009/0067003 A1 | 3/2009 | Haruta et al. |
| 2009/0237692 A1 | 9/2009 | Endoh et al. |
| 2009/0273815 A1 | 11/2009 | Hattori |

*Primary Examiner* — Fred Guillermety
*Assistant Examiner* — Lennin Rodriguezgonzale
(74) *Attorney, Agent, or Firm* — Gerald E. Hespos; Michael J. Porco; Matthew T. Hespos

(57) ABSTRACT

For functions of a multifunction machine for processing of processing items relating to document reading operations and processing items relating to operations other than document reading operations in a case where operation screens for setting content in regard to the processing items in a wizard format display are displayed in the wizard format display, a display order is set in advance for the operation screens for the processing items so that the operation screens for processing items relating to document reading operations are displayed prior to operation screens for processing items relating to operations other than document reading operations.

6 Claims, 16 Drawing Sheets

| PRIORITY | PROCESSING ITEM | NECESSARY/UNNECESSARY FOR DOCUMENT READING | PRECEDENT READING ALLOWED/PROHIBITED |
|---|---|---|---|
| 1 | DOCUMENT SUPPLY SOURCE | NECESSARY | PROHIBITED WHEN "TABLE FEEDING" |
| 2 | DOCUMENT SIZE | NECESSARY | ALLOWED |
| 3 | DOCUMENT ORIENTATION | NECESSARY | ALLOWED |
| 4 | DARKNESS OF READING | NECESSARY | ALLOWED |
| 5 | COLOR/BLACK & WHITE | NECESSARY | ALLOWED |
| 6 | COLOR ADJUSTMENT | NECESSARY | ALLOWED |
| 7 | SINGLE-SIDED/DOUBLE-SIDED READING | NECESSARY | ALLOWED |
| 8 | SINGLE PAGE/DOUBLE PAGE READING | NECESSARY | PROHIBITED WHEN "DOUBLE PAGE" |
| 9 | CONTINUOUS READING | NECESSARY | PROHIBITED WHEN "CONTINUOUS READING ON" |
| 10 | COPY MAGNIFICATION RATIO | UNNECESSARY | — |
| 11 | PAPER SIZE | UNNECESSARY | — |
| 12 | PAPER ORIENTATION | UNNECESSARY | — |
| 13 | SINGLE-SIDED/DOUBLE-SIDED PRINTING | UNNECESSARY | — |
| 14 | SINGLE PAGE/DOUBLE PAGE PRINTING | UNNECESSARY | — |
| 15 | NUMBER OF COPIES | UNNECESSARY | — |
| 16 | SORTING | UNNECESSARY | — |
| 17 | GROUPING | UNNECESSARY | — |
| 18 | DISCHARGE DESTINATION | UNNECESSARY | — |
| 19 | PUNCHING/STAPLING PROCESSES | UNNECESSARY | — |

FIG.5A

| PRIORITY | PROCESSING ITEM | NECESSARY/UNNECESSARY FOR DOCUMENT READING | PRECEDENT READING ALLOWED/PROHIBITED |
|---|---|---|---|
| 1 | DOCUMENT SUPPLY SOURCE | NECESSARY | PROHIBITED WHEN "TABLE FEEDING" |
| 2 | DOCUMENT SIZE | NECESSARY | ALLOWED |
| 3 | DOCUMENT ORIENTATION | NECESSARY | ALLOWED |
| 4 | IMAGE QUALITY OF READING | NECESSARY | ALLOWED |
| 5 | READING RESOLUTION | NECESSARY | ALLOWED |
| 6 | DARKNESS OF READING | NECESSARY | ALLOWED |
| 7 | COLOR/BLACK & WHITE | NECESSARY | ALLOWED |
| 8 | COLOR ADJUSTMENT | NECESSARY | ALLOWED |
| 9 | SINGLE-SIDED/DOUBLE-SIDED READING | NECESSARY | ALLOWED |
| 10 | SINGLE PAGE/DOUBLE PAGE READING | NECESSARY | PROHIBITED WHEN "DOUBLE PAGE" |
| 11 | CONTINUOUS READING | NECESSARY | PROHIBITED WHEN "CONTINUOUS READING ON" |
| 12 | NUMBER OF COPIES TO BE SENT | UNNECESSARY | — |
| 13 | SENDING ADDRESS | UNNECESSARY | — |
| 14 | TIME SPECIFICATION | UNNECESSARY | — |

FIG.5B

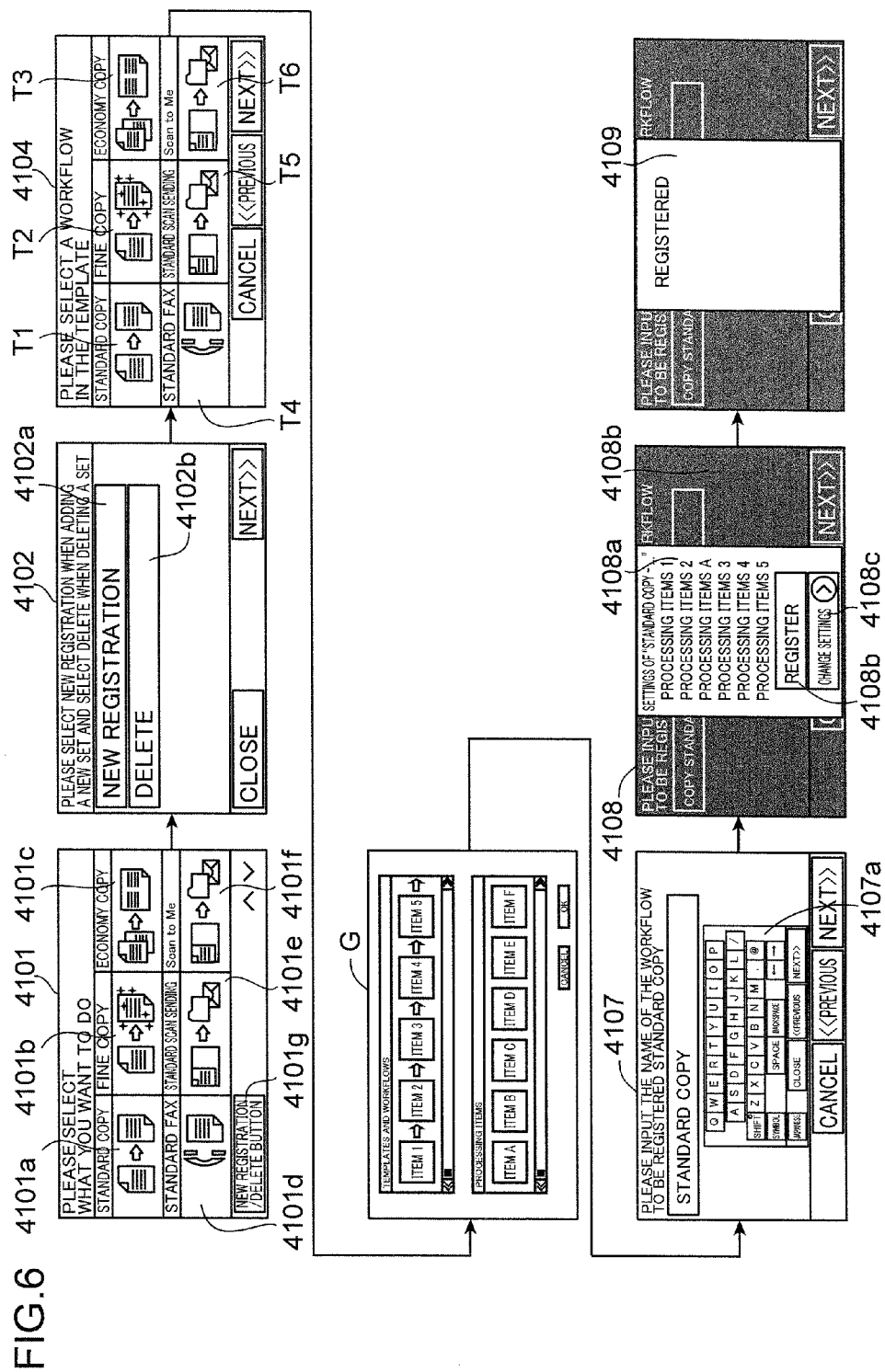

FIG.13
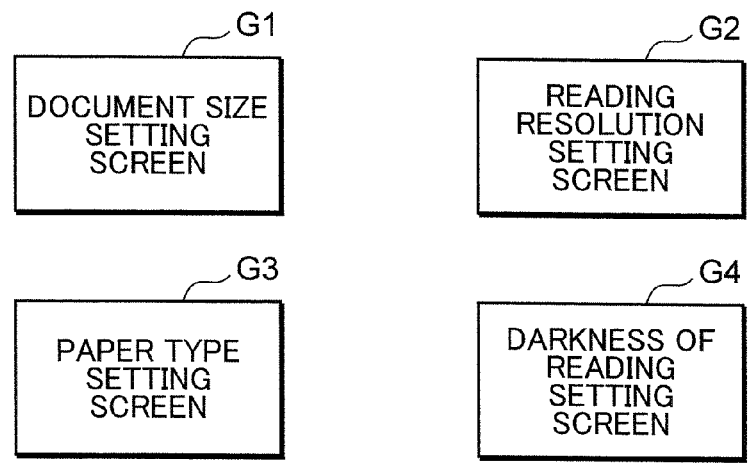
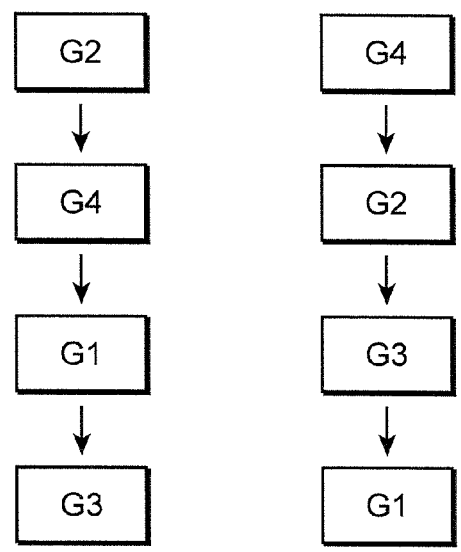
FIG.14A    FIG.14B

FIG.15A

| No. | SETTING ITEM | PRESENCE/ABSENCE OF RELATIONSHIP WITH READING OPERATIONS | PRECEDENT READING ALLOWED/PROHIBITED |
|---|---|---|---|
| 1 | DOCUMENT SUPPLY SOURCE | NECESSARY | PROHIBITED WHEN "TABLE FEEDING" |
| 2 | DOCUMENT SIZE | NECESSARY | ALLOWED |
| 3 | DOCUMENT ORIENTATION | NECESSARY | ALLOWED |
| 4 | DARKNESS OF READING | NECESSARY | ALLOWED |
| 5 | COLOR/BLACK & WHITE | NECESSARY | ALLOWED |
| 6 | COLOR ADJUSTMENT | NECESSARY | ALLOWED |
| 7 | SINGLE-SIDED/DOUBLE-SIDED READING | NECESSARY | ALLOWED |
| 8 | SINGLE PAGE/DOUBLE PAGE READING | NECESSARY | PROHIBITED WHEN "DOUBLE PAGE" |
| 9 | CONTINUOUS READING | NECESSARY | PROHIBITED WHEN "CONTINUOUS READING ON" |
| 10 | COPY MAGNIFICATION RATIO | UNNECESSARY | PROHIBITED |
| 11 | PAPER SIZE | UNNECESSARY | PROHIBITED |
| 12 | PAPER ORIENTATION | UNNECESSARY | PROHIBITED |
| 13 | SINGLE-SIDED/DOUBLE-SIDED PRINTING | UNNECESSARY | PROHIBITED |
| 14 | SINGLE PAGE/DOUBLE PAGE PRINTING | UNNECESSARY | PROHIBITED |
| 15 | NUMBER OF COPIES | UNNECESSARY | PROHIBITED |
| 16 | SORTING | UNNECESSARY | PROHIBITED |
| 17 | GROUPING | UNNECESSARY | PROHIBITED |
| 18 | DISCHARGE DESTINATION | UNNECESSARY | PROHIBITED |
| 19 | PUNCHING/STAPLING PROCESSES | UNNECESSARY | PROHIBITED |

FIG.15B

| No. | SETTING ITEM | PRESENCE/ABSENCE OF RELATIONSHIP WITH READING OPERATIONS | PRECEDENT READING ALLOWED/PROHIBITED |
|---|---|---|---|
| 1 | DOCUMENT SUPPLY SOURCE | NECESSARY | PROHIBITED WHEN "TABLE FEEDING" |
| 2 | DOCUMENT SIZE | NECESSARY | ALLOWED |
| 3 | DOCUMENT ORIENTATION | NECESSARY | ALLOWED |
| 4 | IMAGE QUALITY OF READING | NECESSARY | ALLOWED |
| 5 | READING RESOLUTION | NECESSARY | ALLOWED |
| 6 | DARKNESS OF READING | NECESSARY | ALLOWED |
| 7 | COLOR/BLACK & WHITE | NECESSARY | ALLOWED |
| 8 | COLOR ADJUSTMENT | NECESSARY | ALLOWED |
| 9 | SINGLE-SIDED/DOUBLE-SIDED READING | NECESSARY | ALLOWED |
| 10 | SINGLE PAGE/DOUBLE PAGE READING | NECESSARY | PROHIBITED WHEN "DOUBLE PAGE" |
| 11 | CONTINUOUS READING | NECESSARY | PROHIBITED WHEN "CONTINUOUS READING ON" |
| 12 | NUMBER OF COPIES TO BE SENT | UNNECESSARY | PROHIBITED |
| 13 | SENDING ADDRESS | UNNECESSARY | PROHIBITED |
| 14 | TIME SPECIFICATION | UNNECESSARY | PROHIBITED |

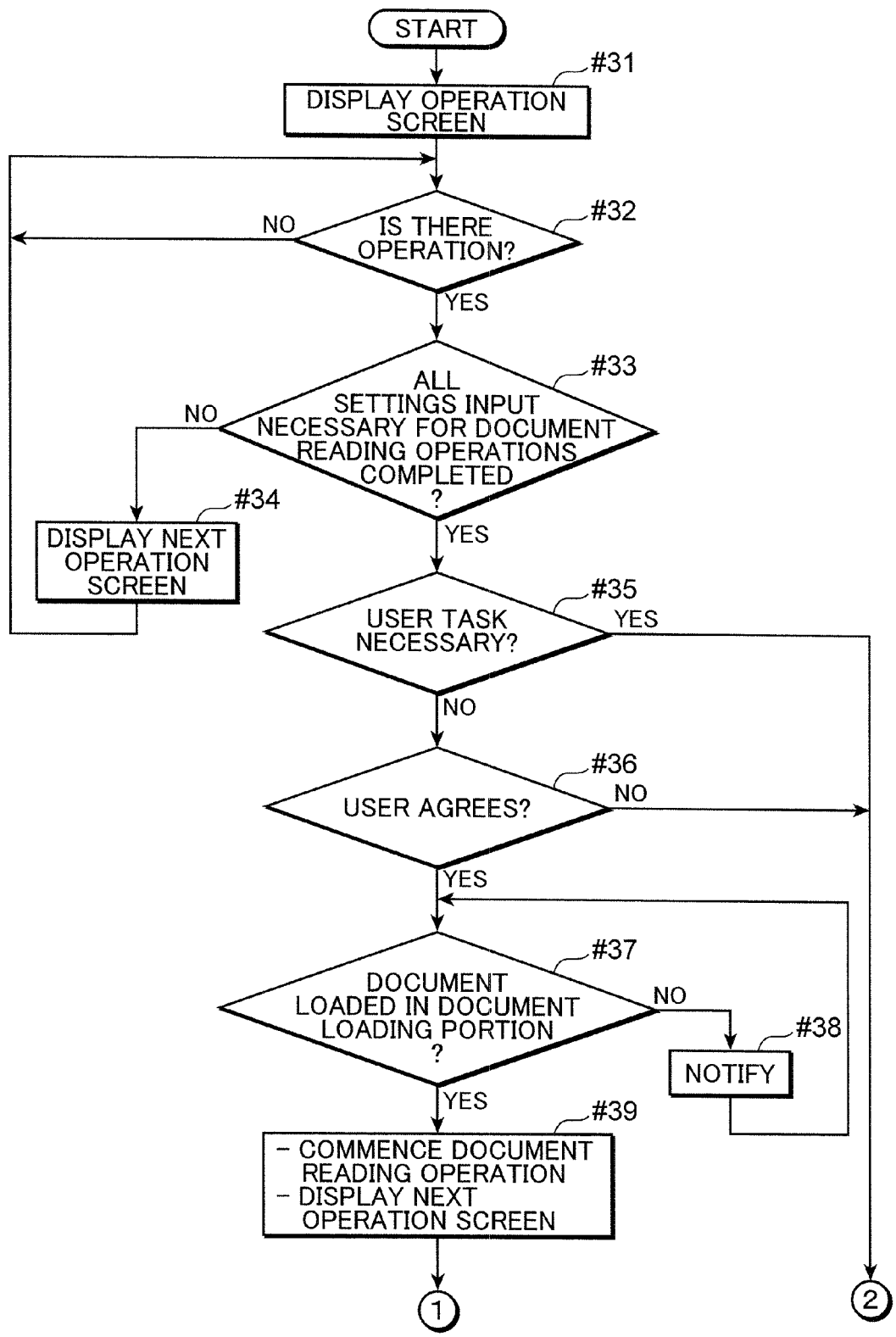

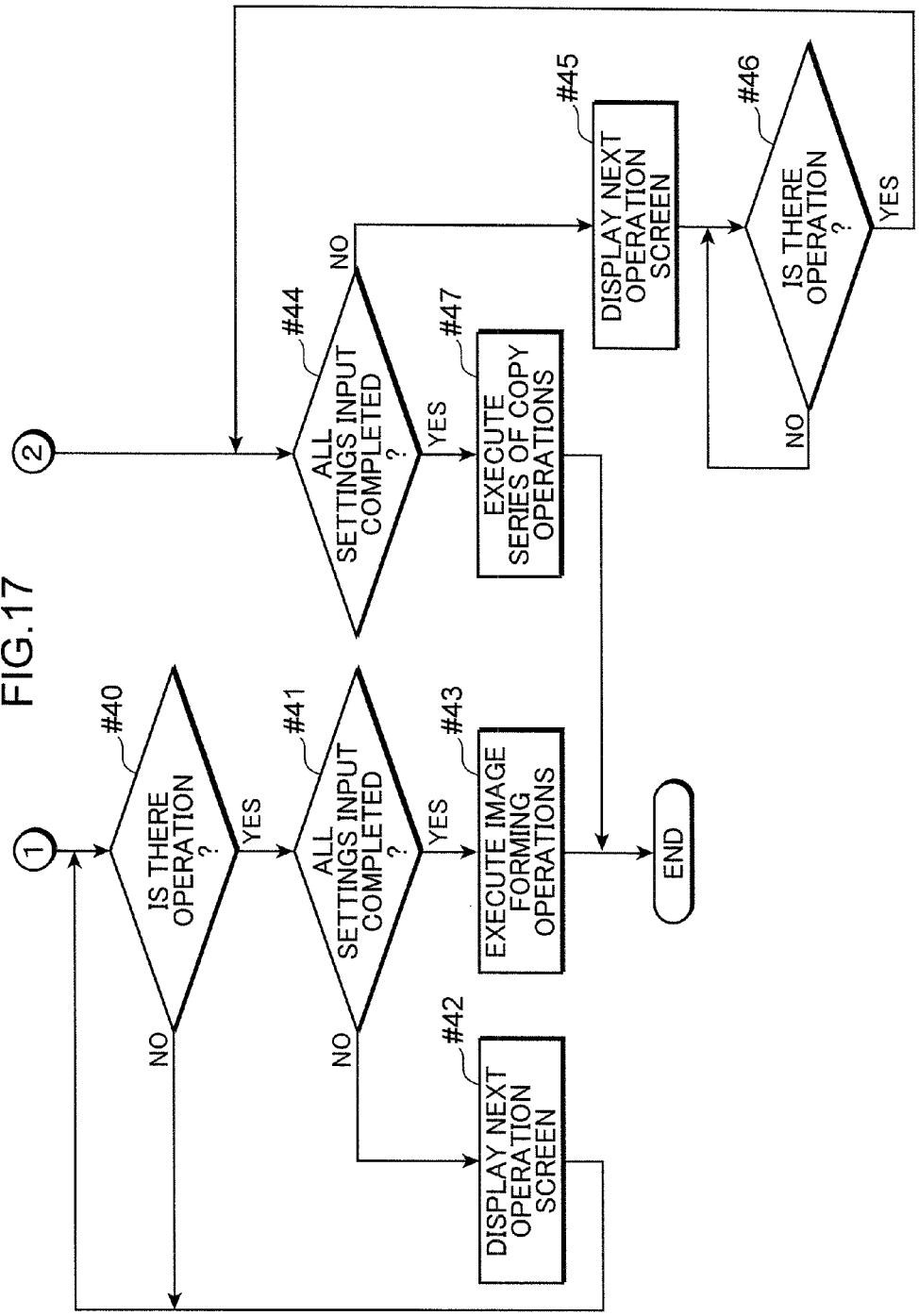

CONTROL DEVICE, IMAGE FORMING APPARATUS, AND READING DEVICE

BACKGROUND OF THE INVENTION

1. Field of the Invention

The present invention relates to control devices, image forming apparatuses, and reading devices.

2. Description of the Related Art

Conventionally, in apparatuses such as image forming apparatuses, to improve the operability of executing functions by a user when setting paper sizes, magnification ratios, darkness, aggregate printing, and document image quality to be applied during copy operations, it is known to display function operation screens (operation screens) on the display portion in a wizard format display (user interactive format). In this way, the user can register in the image forming apparatus the contents of settings to be applied in the copy operation as a workflow in a manner that is simpler than is conventionally the case by following guidance according to screens that are successively switched and displayed on the display portion.

Some of these apparatuses carry out control such that reading of the image is carried out in a basic mode that is set in advance prior to the document reading settings being confirmed in the document reading portion, and in a case where settings different from the basic mode are confirmed as the final reading mode after commencement of reading, the image data that has been read using the basic mode is replaced by image data that has been read using the reading mode that has been confirmed.

SUMMARY OF THE INVENTION

The present invention improves the above-described conventional technologies.

That is, the present invention is directed to a control device that is provided with a storage portion that stores display data for a first type operation screen for setting and inputting settings values regarding settings items relating to document reading operations of a document reading portion, and display data for a second type operation screen for setting and inputting settings values regarding processing items unrelated to document reading operations by the document reading portion, and a display control portion that displays on a display portion, in a wizard format, operation screens for setting the setting values regarding processing items in an image processing device in use of the first type operation screen and the second type operation screen stored in the storage portion, wherein the display control portion displays on the display portion the first type operation screen prior to the second type operation screen when displaying the first type operation screen and the second type operation screen on the display portion in the wizard format.

BRIEF DESCRIPTION OF THE DRAWINGS

FIGS. 5A and 5B are diagrams showing examples of tables stored by the determination portion.

FIG. 6 is a diagram showing the transitions of display screens on the display portion when generating and registering a workflow in regard to the copy function.

FIG. 13 is a diagram showing operation screens (operation screens) of settings items for which the user is to input settings values in a case where the image forming apparatus is to execute duplication (copying) of a paper.

FIGS. 14A and 14B are diagrams showing examples of display orders of operation screens according to the other embodiment.

FIGS. 15A and 15B are diagrams showing storage contents of the storage portion.

FIG. 16 is a flowchart showing a series of processes by the control portion of the multifunction machine 1 according to this other embodiment.

FIG. 17 is a flowchart showing a series of processes by the control portion of the multifunction machine 1 according to this other embodiment.

DETAILED DESCRIPTION OF THE PREFERRED EMBODIMENTS

Figure 1:
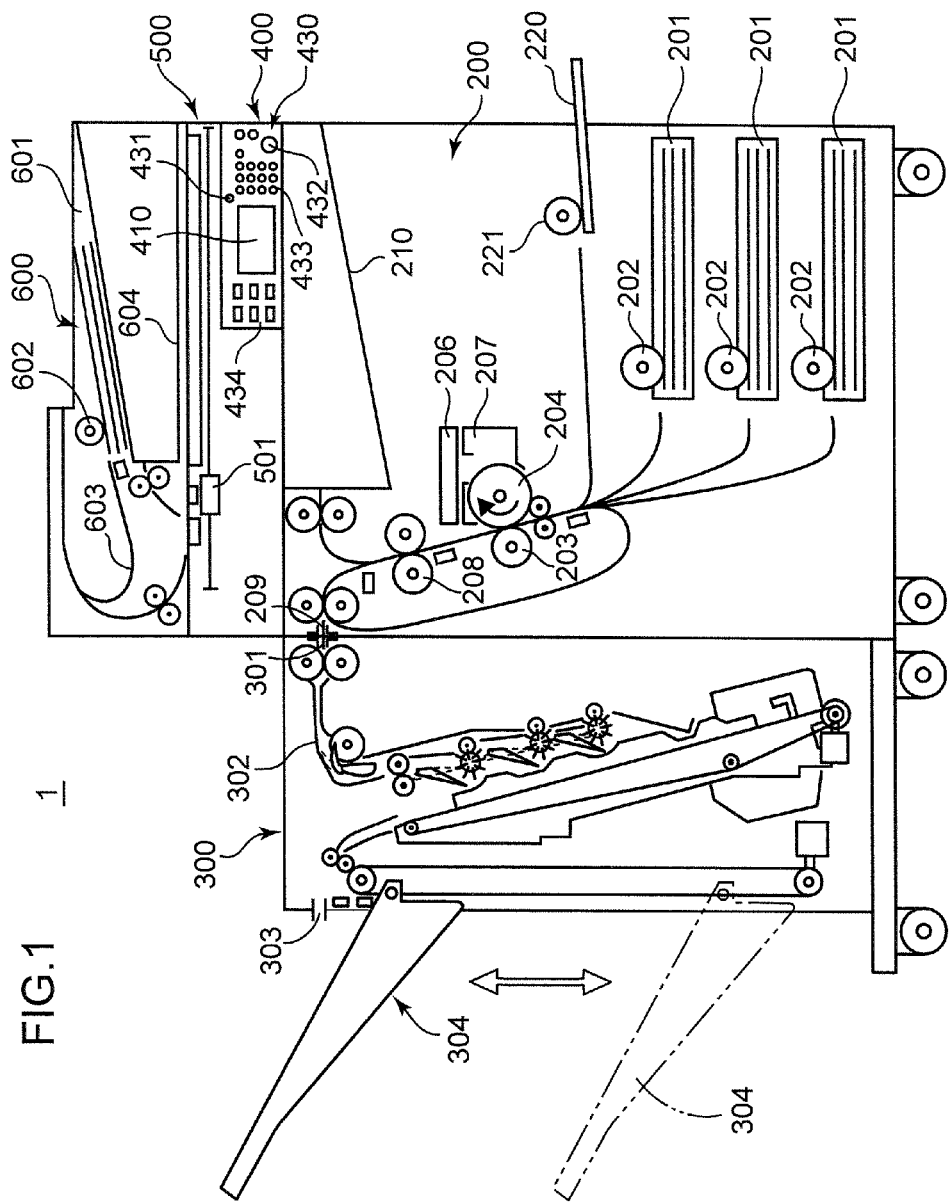
FIG. 1 is a lateral outline drawing showing a configuration of a multifunction machine, which is one example of an image forming apparatus according to the present invention.
Figure 2:
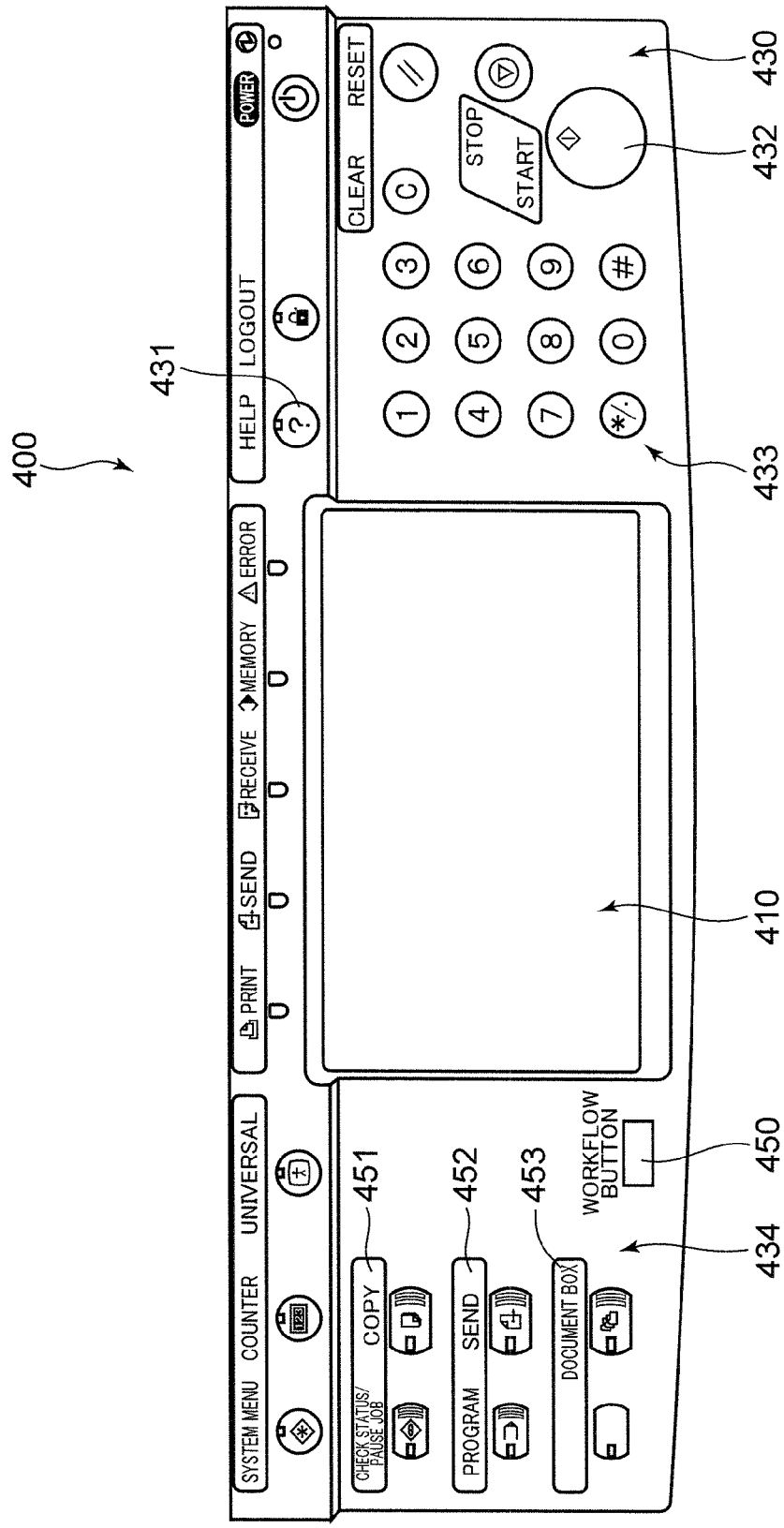
FIG. 2 is an enlarged view of a portion of an operation portion.

Hereinafter, description is given regarding a control device, an image forming apparatus, and a reading device according to the present invention. FIG. 1 is a lateral outline drawing showing a configuration of a multifunction machine, which is one example of an image forming apparatus according to the present invention. FIG. 2 is an enlarged view of a portion of an operation portion 400.

A multifunction machine 1 is provided with a combination of functions such as a scanner function, a fax function, a printer function, and a copy function. The multifunction machine 1 is configured provided with a main portion 200, a paper post-processing unit 300 that is arranged on a paper discharge side, for example the left side, of the main portion 200, an operation portion 400 for an operator to input various operational commands or the like, a document reading portion 500 arranged above the main portion 200, and a document feeding portion 600 arranged above the document reading portion 500.

As is also shown in FIG. 2, the operation portion 400 is provided with a display portion 410 constituted by an LCD (liquid crystal display) or the like, and an operational key portion 430 by which operational instructions are inputted by the operator. The operational key portion 430 is provided with components such as a help key 431, a start key 432, a numeric keypad 433, and function switching keys 434.

The help key 431 is for receiving from the operator an instruction to display on the display portion 410 an operational guidance screen (help screen), which displays various operational methods relating to scanner functions, fax functions, printer functions, and copy functions and the like.

The start key 432 is a key for receiving from the operator an instruction to commence operations such as copying operations and scanning operations. The numeric keypad 433 includes keys for receiving from the operator instructions such a number of copies when copying. The function switching keys 434 are keys for receiving from the operator instructions to switch functions by which various functions are switched between each other such as the copy function, a sending function (in the scanner function or fax function or the like), and a box function (a function by which data stored in a storage region (mailbox) provided in an HDD 74 described later for each operator is read out and printed).

The display portion 410 is constituted by an LCD (liquid crystal display) or the like and is provided with a touch panel unit or like in which a touch panel is integrated. The display portion 410 displays various operation screens and enables commands to execute various functions to be inputted by the operator by touching the display screen (displayed operational keys).

A workflow button 450 is a button for receiving input from a user of instructions to commence processing for carrying out workflow operations by which functions such as copying operations and scanning operations or the like are executed in accordance with the content of settings that are set in advance by the user, as well as operations for registering, altering, and deleting these workflow operations.

A copy button 451 is a button for receiving from the user an instruction to commence the copy function. A send button 452 is a button for receiving from the user an instruction to commence an email sending function by which document data is read by the scanner and sent by email to a specified addressee. A document box button 453 is a button for receiving from the user an instruction to commence a document box function by which document data is read by the scanner and stored in a specified storage location (such as a folder provided in the HDD 74 of the multifunction machine 1). When any of the copy button 451, the send button 452, or the document box button 453 undergoes a pressing operation by the user, an initial display screen of the function corresponding to the pressed button is displayed on the display portion 410 and processing of that function commences.

Returning to FIG. 1, the document feeding portion 600 is provided with a document loading portion 601, a paper feeding roller 602, a document transport portion 603, and a document discharge portion 604, and the document reading portion 500 is provided with a scanner 501. The paper feeding roller 602 draws in sheet by sheet a required number of sheets of documents that have been set in the document loading portion 601, and the document transport portion 603 successively transports the drawn-in documents to a reading position of the scanner 501. The scanner 501 successively reads an image of the transported documents, and documents that have been read are discharged to the document discharge portion 604.

The main portion 200 is provided with components such as multiple paper feeding cassettes 201, multiple paper feeding rollers 202, a transfer roller 203, a photosensitive drum 204, an exposure device 206, a development device 207, fixing rollers 208, a discharge outlet 209, a discharge tray 210, a single sheet feeding tray 220 and a single sheet feeding roller 221.

The photosensitive drum 204 is uniformly charged by a charging device (not shown in drawings) while rotating in the direction indicated by the arrow. The exposure device 206 scans the photosensitive drum 204 with a laser beam modulated in response to the image of the document that has been read by the document reading portion 500, and forms an electrostatic latent image for each color on the surface of the drum. The development device 207 forms a toner image by supplying a black developing agent to the photosensitive drum 204.

On the other hand, the paper feeding rollers 202 withdraw recording paper from the paper feeding cassettes 201 storing printing sheets, and feed these to the transfer roller 203. The transfer roller 203 transfers the toner image on the photosensitive drum 204 to the transported printing sheet, and the fixing rollers 208 apply heat to the transferred toner image to fix it to the printing sheet. After this, the printing sheet is conveyed from the discharge outlet 209 of the main portion 200 to the paper post-processing unit 300. The printing sheet may also be discharged to the discharge tray 210 as required.

The paper post-processing unit 300 is provided with components such as a transport inlet 301, a printing sheet transport portion 302, a discharge outlet 303, and a stack tray 304. The printing sheet transport portion 302 successively carries printing sheets that have been inputted from the discharge outlet 209 to the transport inlet 301, and finally discharges the printing sheets from the discharge outlet 303 to the stack tray 304. The stack tray 304 is configured to be capable of moving up and down in the directions indicated by the arrow in response to the number of accumulated printing sheets that have been outputted from the discharge outlet 303.

Figure 3:
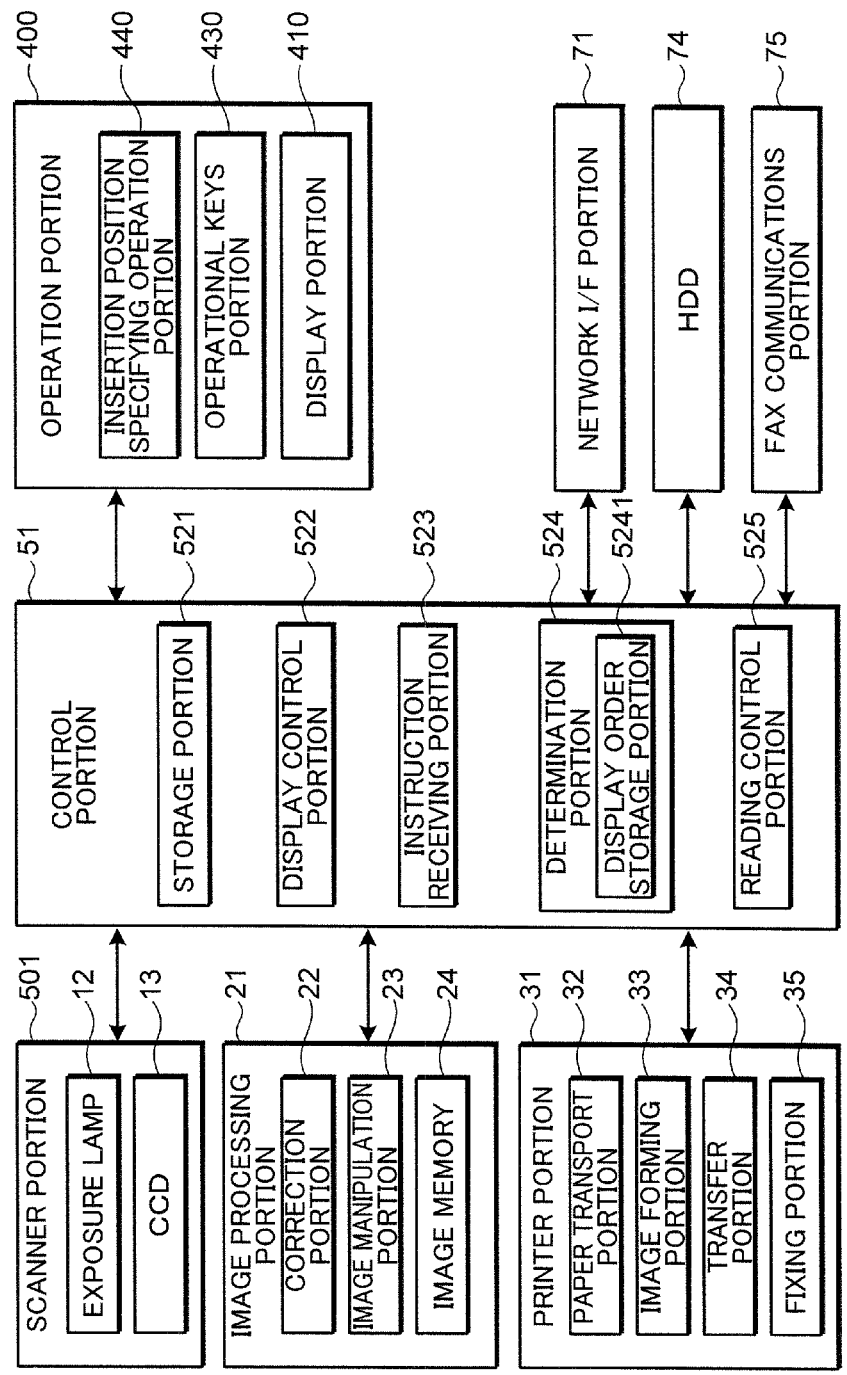
FIG. 3 is a block diagram showing an electrical configuration of the multifunction machine.

FIG. 3 is a block diagram showing an electrical configuration of the multifunction machine 1 shown in FIG. 1. As shown in FIG. 3, the multifunction machine 1 is provided with a scanner portion 501, and image processing portion 21, a printer portion 31, an operation portion 400, a control portion 51, a network I/F (interface) portion 71, an HDD (hard disk drive) 74, and a fax communications portion 75.

The scanner portion 501 includes an exposure lamp 12 and a CCD (charge coupled device) 13 that constitute the scanner portion 501 shown in FIG. 1. The scanner portion 501 reads an image from the document by irradiating the document using the exposure lamp 12 and receiving the reflected light thereof using the CCD 13, and an image corresponding to the image that has been read is outputted to the image processing portion 21.

The image processing portion 21 includes a correction portion 22, an image manipulation portion 23, and an image memory 24. The image processing portion 21 processes the image that has been read using the correction portion 22 and the image manipulation portion 23 as required. Images processed by the image processing portion 21 are stored in the image memory 24 for printing or outputted to the printer portion 31. The correction portion 22 carries out predetermined correction processing such as level corrections and gamma (γ) corrections on the images that have been read. The image manipulation portion 23 carries out various manipulation processes such as compression or expansion processing of the image, and magnification or reduction processing or the like.

The printer portion 31 includes a paper transport portion 32 constituted by components such as the paper feeding cassettes 201 and the paper feeding rollers 202 shown in FIG. 1, an image forming portion 33 constituted by components such as the photosensitive drum 204, the exposure device 206, and the development device 207 shown in FIG. 1, a transfer portion 34 constituted by components such as the transfer roller 203 shown in FIG. 1, and a fixing portion 35 constituted by components such as the fixing rollers 208 shown in FIG. 1. The printer portion 31 uses data of a document that has been read by the scanner portion 501 to print an image on a recording paper. Specifically, the paper transport portion 32 transports a recording paper to the image forming portion 33, the image forming portion 33 forms a toner image corresponding to the aforementioned image, the transfer portion 34 transfers the toner image to the recording paper, and the fixing portion 35 fixes the toner image onto the recording paper to form an image.

The network I/F portion 71 uses a network interface (10/100 base-TX) or the like to control the sending and receiving of various data through a LAN to and from external devices. The HDD 74 stores data such as images that have been read by the scanner portion 501 and output formats that have been set for these images.

The operation portion 400 is provided with the display portion 410 and the operational key portion 430 as shown in FIG. 1 and FIG. 2. Under the control of a display control portion 522, the display portion 410 displays multiple keys for receiving input of various instructions using the touch panel function. Components such as the function switching keys 434, the start key 432, and the numeric keypad 433 shown in FIG. 2 are provided on the operational key portion 430. The control portion 51 receives instructions inputted by the operator from the display portion 410 and the keys of the operational key portion 430.

Furthermore, in the present embodiment, the operation portion 400 has a function as an insertion position specifying operation portion 440. This point is described later.

The fax communications portion 75 includes an encoding/decoding portion (not shown in drawings), a modulation/demodulation portion (not shown in drawings), and an NCU (network control unit) (not shown in drawings). The fax communications portion 75 performs functions such as sending image data of a document that has been read by the scanner portion 501 to a fax machine or the like via a telephone circuit and receiving image data that has been sent from a fax machine or the like. The encoding/decoding portion compresses and encodes image data that is to be sent, and decompresses and decodes image data that has been received. The modulation/demodulation portion modulates the compressed and encoded image data to audio signals, and demodulates received signals (audio signals) to image data. The NCU controls telephone circuit connections with originating or destination fax machines or the like.

The control portion 51 is configured provided with a CPU that administers operational control of the multifunction machine 1, a RAM (random access memory) having a function of temporarily storing data and a function as a work area, a ROM that stores programs in advance, and a CPU that reads out and executes the programs from the ROM, and the CPU, the RAM, and the ROM are configured so as to carry out exchanges of data through a data bus.

The multifunction machine 1 according to the present embodiment is configured to display operation screens for receiving settings input of the settings content in regard to each processing item provided in the multifunction machine 1 using a wizard format display (user interactive format) on the display portion 410, and cause the user to set input of the settings content (settings values) to be applied to the copy operation in accordance with guidance by the operation screens, which are successively switched and displayed on the display portion 410.

The control portion 51 has functions as a storage portion 521, the display control portion 522, an instruction receiving portion 523, a determination portion 524, and a reading control portion 525 as functions relating to displaying the operation screens.

The storage portion 521 stores various data for displaying operational guidance to the operator (in particular, in the present embodiment, the storage portion 521 stores display data for displaying on the display portion 410 operation screens for receiving settings input for which registration is required to execute functions such as the copy operation and the scanning operation) and image data (including data of images, text, and symbols and the like) for displaying the operational status and the like of the functions such as the scanner function, fax function, printer function, and the copy function.

Furthermore, the storage portion 521 stores multiple templates (fixed forms), which are combinations of various processing items in regard to functions that are executable by the multifunction machine 1. For example, these templates are combinations of processing items such as number of copies, sheet size, magnification ratio, darkness, aggregate printing, document image quality, and double-sided division to be applied in the functions for each function such as the copy operation.

The templates are used in workflows for carrying out a process of guiding the user for settings input for which registration is required to execute a function such as the copy function, or workflows in which settings content (settings values) of each processing item to be applied when executing a function such as the copy function are stored and the function such as the copy function is executed according to this settings content.

The display control portion 522 controls the display operations of the display portion 410. For example, the display control portion 522 displays on the display portion 410 operation screens for receiving from the user settings input for which registration is required to execute functions such as the copy operation and the scanning operation.

The instruction receiving portion 523 corresponds to a first reception portion and a second reception portion, and receives operational information outputted from the operation portion 400 when operations are carried out at the operation portion 400. For example, when operation screens relating to the processing items are being displayed by the display control portion 522, the instruction receiving portion 523 receives from the user instructions specifying the settings content (instructions by which settings values are set and input) using the touch panel function provided on the display portion 410 for example, or receives from the user a selection of a desired template from among the templates stored in the storage portion 521 using the touch panel function for example.

Figure 4:
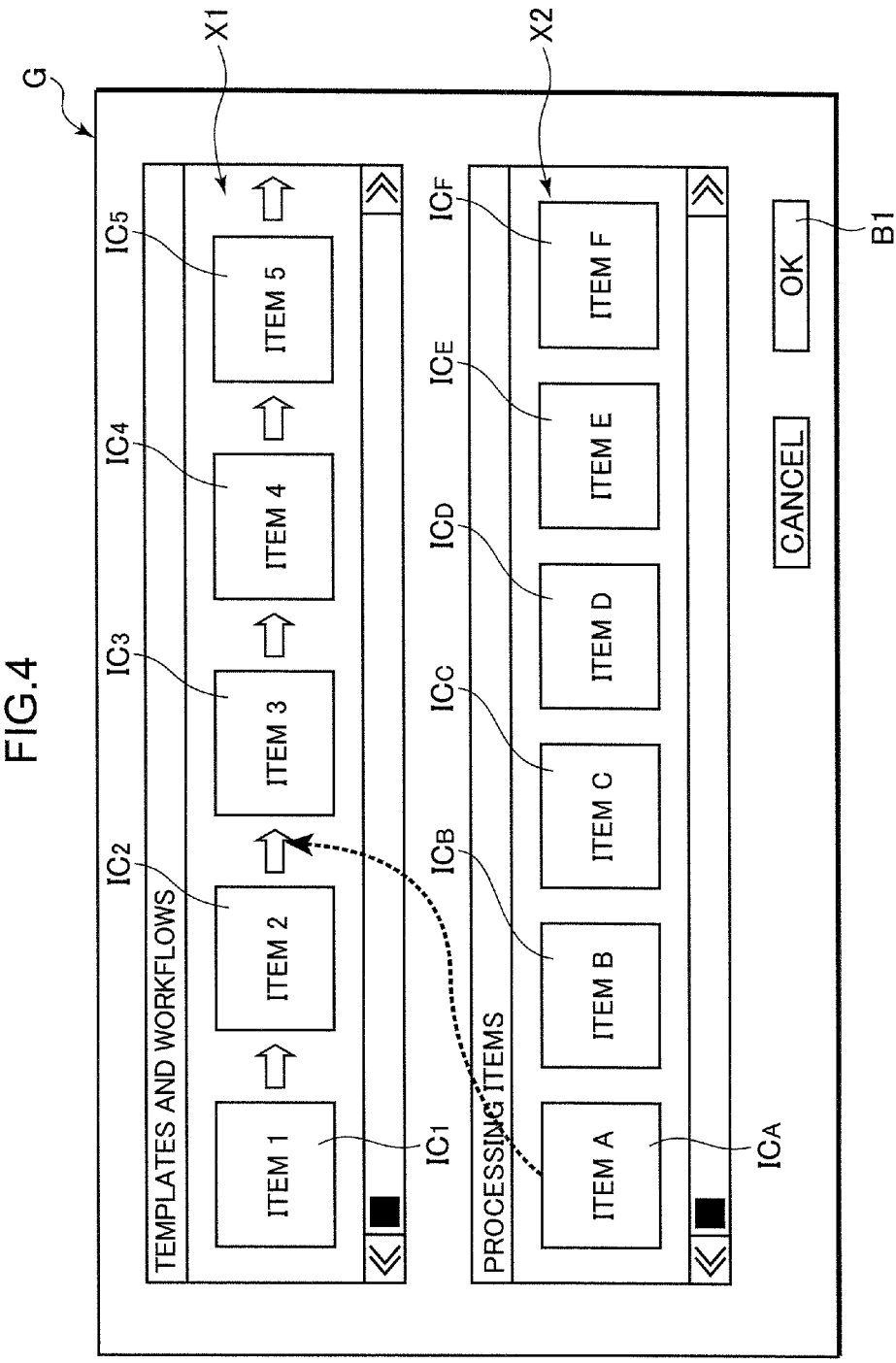
FIG. 4 is one example of a customization screen.

In addition to the above-described configuration, the present embodiment is configured to be capable of setting (capable of customizing) which operation screens of processing items are to be displayed in which order using a customization screen, which is described later, and the aforementioned insertion position specifying operation portion 440 when displaying on the display portion 410 the operation screens for receiving settings input for which registration is required to execute functions such as the copy operation and the scanning operation using a wizard format display. FIG. 4 is one example of these customization screens.

The customization screen G shown in FIG. 4 has a first display region X1 in which workflow templates, which are a base of customization, are displayed, and a second display region X2, in which icons indicating operation screens of processing items that can be added to the base workflow are enumerated and displayed. In the first display region X1 shown in FIG. 4, a base workflow template is displayed in which settings content is set as initial values, these being the operation screens for processing items 1 to 5 displayed in a wizard format display in the order of processing item 1, 2, 3, 4, and 5 using multiple icons $IC_1$ to $IC_5$ assigned to the processing items 1 to 5 item names respectively. Furthermore, in the second display region X2 shown in FIG. 4, multiple icons $IC_A$ to $IC_F$ are displayed, which are assigned respectively to the item names of processing items A to F that can be added to the workflow. The icons $IC_1$ to $IC_5$ and $IC_A$ to $IC_F$ that are displayed in the first and second display regions X1 and X2 are used for receiving of the processing item assigned to that icon.

The instruction receiving portion 523 receives workflow customization instructions from the insertion position specifying operation portion 440 during display of the customization screen G. The insertion position specifying operation portion 440 is achieved using the touch panel function provided in the display portion 410 for example.

Specifically, in a case where a user desires to add any of the processing items displayed in the second display region X2 to the workflow displayed in the first display region X1, the user carries out an operation of inserting the icon that indicates the operation screen of the processing item to be added through dragging and dropping using a device such as a mouse pointer to a specific position of the enumerated icons indicating operation screens of the processing items displayed in the first display region X1 (hereinafter, this operation is referred to as adding operation 1).

For example, in a case where the workflow currently displayed in the first display region X1 is as shown in FIG. 4 and the user desires to add the operation screen for the processing item A of the processing items A to F to the workflow and to have the operation screen for the processing item A displayed between the operation screen of the processing item 2 and the operation screen of the processing item 3, the user carries out an operation of dragging the icon $IC_A$ indicating the operation screen of the processing item A displayed in the second display region X2 to a position between the icon $IC_2$ indicating the operation screen of the processing item 2 and the icon $IC_3$ indicating the operation screen of the processing item 3 in the first display region X1 as a target position, and drops the icon in this target position.

Furthermore, when an unnecessary processing item is currently present among the processing items in the workflow displayed in the first display region X1, the user carries out an operation through dragging and dropping of moving the icon indicating the operation screen of that processing item to the second display region X2 (hereinafter, this operation is referred to as deletion operation 2).

For example, in a case where the workflow currently displayed in the first display region X1 is as shown in FIG. 4, and the user considers that of processing items 1 to 5, the processing item 3 for example is unnecessary, the user carries out an operation of dragging the icon $IC_3$ indicating the operation screen of the processing item 3 displayed in the first display region X1 to the second display region X2, then drops this icon inside the second display region X2.

Further still, in a case of changing the display order of operation screens for the processing items in the workflow displayed in the first display region X1, the user carries out an operation through a drag and drop operation of changing the enumerated order of the icon indicating the operation screen of processing item whose positional order is to be changed (hereinafter, this operation is referred to as a change operation 3).

For example, in a case where the workflow currently displayed in the first display region X1 is as shown in FIG. 4, and the user desires to swap the order of the processing item 2 and the processing item 4 for example among the processing items 1 to 5, through an operation of dragging and dropping the icons, the user swaps the position of the icon indicating the operation screen of the processing item 2 and the position of the icon indicating the operation screen of the processing item 4. The instruction receiving portion 523 receives operational information indicating the foregoing adding operation 1, the deletion operation 2, and the change operation 3 by the user.

The determination portion 524 determines whether or not the operations of the user in the customization screen G are appropriate. In the present embodiment, the display order of the operation screens is set in advance for when a workflow is to be called up and the operation screens displayed in the wizard format display for the operation screens of the processing items, and the determination portion 524 is provided with a display order storage portion 5241 that stores in advance a table for each of the processing items in which display order information, information of whether or not the processing item requires settings input of the settings values for carrying out document reading operations (a processing item relating to reading operations of documents), and information of whether or not a precedent reading operation, which is described later, is possible. It should be noted that the display order storage portion 5241 may be provided separate from the determination portion 524.

Here, in the present embodiment, in a case where a mode (for example, the copy mode) is selected in which a series of operations including a reading operation of the document and operations other than that are executed, the display control portion 522 displays the operation screens for setting and inputting content (settings values) of processing items relating to document reading operations (first type operation screens) on the display portion 410 prior to operation screens for setting and inputting content (settings values) of processing items unrelated to document reading operations (second type operation screens). In this way, settings input of content (settings values) of processing items relating to document reading operations are prompted to the user prior to the content (settings values) of processing items unrelated to the reading operations, and the reading control portion 525 is able to execute reading operations (the precedent reading operations) using the document reading portion 500 at the time point when all the content (settings values) of processing items relating to document reading operations are completed even if the content (settings values) of processing items unrelated to document reading operations are not completed.

For example, in the case of the copy mode, a document reading operation and an operation of image forming onto the paper are executed as a series of operations. At this time, as shown in FIG. 5, while there are document size and darkness of reading by the document reading portion 500 for example as processing items relating to document reading operations, there are paper size and number of copies for example as processing items relating to image forming operations.

In a case where the multifunction machine 1 is now to execute duplication (copying) of a paper, four processing items, these being the aforementioned "document size," "darkness of reading," "paper size," and "number of copies," are determined as processing items for which settings values are to be inputted by the user.

At this time, in the present embodiment, the display order of processing items relating to document reading operations is set higher than the display order of processing items unrelated to document reading operations as shown in FIG. 5, and in the foregoing example, the display order is set so that the operation screens for the document size and the darkness of reading relating to the document reading operations are displayed on the display portion 410 prior to the operation screens for the paper size and number of copies relating to the image forming operations.

Then, in a case where the adding operation 1 and the change operation 3 have been carried out, the determination portion 524 determines whether or not the thus-set display order corresponds to the display order prescribed in the table. For example, in a case where the icon $IC_A$ indicating the operation screen of the processing item A is dragged and dropped to a position between the icon $IC_2$ indicating the operation screen of the processing item 2 and the icon $IC_3$ indicating the operation screen of the processing item 3, the determination portion 524 determines whether or not the display order of the operation screens (the operation screen for the processing item 2→the operation screen for the processing item A→the operation screen for the processing item 3) is in accordance with the display order prescribed in the table.

That is, in a case where the processing item 2 is "document size" for example, the processing item 3 is "darkness of reading" for example, and the processing item A is "document orientation" for example, the display order of the operation screens set by the drag and drop operation of the user becomes the operation screen for "document size"→the operation screen for "document orientation"→the operation screen for "darkness of reading," and this corresponds to the display order that is set in the table, and therefore in this case the determination portion 524 determines that the operation of the user is appropriate and stores this information indicating the operational content of this user.

On the other hand, in a case where the processing item 2 is "document size" for example, the processing item 3 is "darkness of reading" for example, and the processing item A is not "document orientation" but is "copy magnification ratio" for example, the display order of the operation screens set by the drag and drop operation of the user becomes the operation screen for "document size"→the operation screen for "copy magnification ratio"→the operation screen for "darkness of reading," and this does not correspond to the display order that is set in the table. Accordingly, in this case, the determination portion 524 determines that the operation of the user is not appropriate, and disregards without saving the information indicating the operational content of the user.

When the determination portion 524 determines that the operation of the user is not appropriate, the display control portion 522 displays a warning message on the display portion 410 to the effect that the operation of the user cannot be accepted. The display control portion 522 has a function as a notification portion.

The reading control portion 525 controls reading operations by the document reading portion 500, and in particular, in the present embodiment, in a case where a function (for example the copy function) including document reading operations and operations other than this is to be executed, the reading control portion 525 induces precedent commencement of reading operations by the document reading portion 500 at the time point when the settings input of content (settings values) at the operation screens for all the processing items relating to document reading operations among the operation screens displayed using the wizard format display have been received by the instruction receiving portion 523, even if settings input of the settings values for all the processing items relating to other operations have not been completed.

It should be noted that a control device as one embodiment of the present embodiment is configured as (1) a device having the storage portion 521 and the display control portion 522 of the above-described control portion 51, or (2) a device having the storage portion 521, the display control portion 522, the instruction receiving portion 523, the determination portion 524, the display order storage portion 5241, and the reading control portion 525.

Next, description is given of processing when generating and registering a workflow in the multifunction machine 1. FIG. 6 is a diagram showing the transitions of display screens on the display portion 410 when generating and registering a workflow in regard to the copy function.

When the main power of the multifunction machine 1 is turned on by the user, for example when the copy button 451 is pressed and the copy function commences, the display control portion 522 displays an initial screen (omitted from the drawings) on the display portion 410.

When a workflow button 450 on the operation portion 400 is pressed by the user during the display of this initial screen and a workflow commencement instruction is received by the instruction receiving portion 523, the display control portion 522 displays a workflow screen 4101 (FIG. 6). In this way, it is possible to generate and register a workflow and to commence a deletion operation. The display control portion 522 displays a new registration/delete button 4101g for receiving new registrations and deletions of workflows from the user on the workflow screen 4101.

It should be noted that in a case where the workflow button 450 is not pressed by the user (a workflow commencement instruction is not received) during display of the initial screen, and a pressing operation of the start key 432 or the numeric keypad 433 is carried out using settings content such as paper selection and magnification ratio specified by the user in the initial screen or settings content for which settings have already been performed, thereby inputting an instruction to execute copy operations, the copy operations or the like are executed ordinarily in accordance with the pressing operation.

On the other hand, when the new registration/delete button 4101g is pressed by the user during display of the workflow screen 4101 by the display control portion 522, the display control portion 522 displays on the display portion 410 a workflow registration/delete screen 4102 (FIG. 6) prompting the user to instruct selection of a new registration or deletion of a workflow.

Displayed in the workflow registration/delete screen 4102 are a new registration button 4102a for receiving instruction of a new registration of a workflow from the user, and a deletion button 4102b for receiving instruction of a deletion of a workflow from the user. Description of processing and the like in a case where the deletion button 4102b is pressed is omitted.

When the new registration button 4102a is pressed by the user during display of the workflow registration/delete screen 4102, and an instruction for a new registration of a workflow is received by the instruction receiving portion 523 through the touch panel function, the display control portion 522 displays on the display portion 410 a template selection screen 4104 (FIG. 6) that prompts selection of a template to be used in generating a workflow on the display portion 410. Images T1 to T6 indicating templates that can be used in generating a workflow are displayed in the template selection screen 4104.

When any of the images T1 to T6 indicating templates is pressed by the user during display of the template selection screen 4104 and a selection of a wizard display format template to be used in generating a workflow is received by the instruction receiving portion 523 through the touch panel function, the display control portion 522 reads out the selected template from the storage portion 521 and displays on the display portion 410 a customization screen G (see FIG. 4) of the workflow indicated by the template that has been read out.

Figure 7:
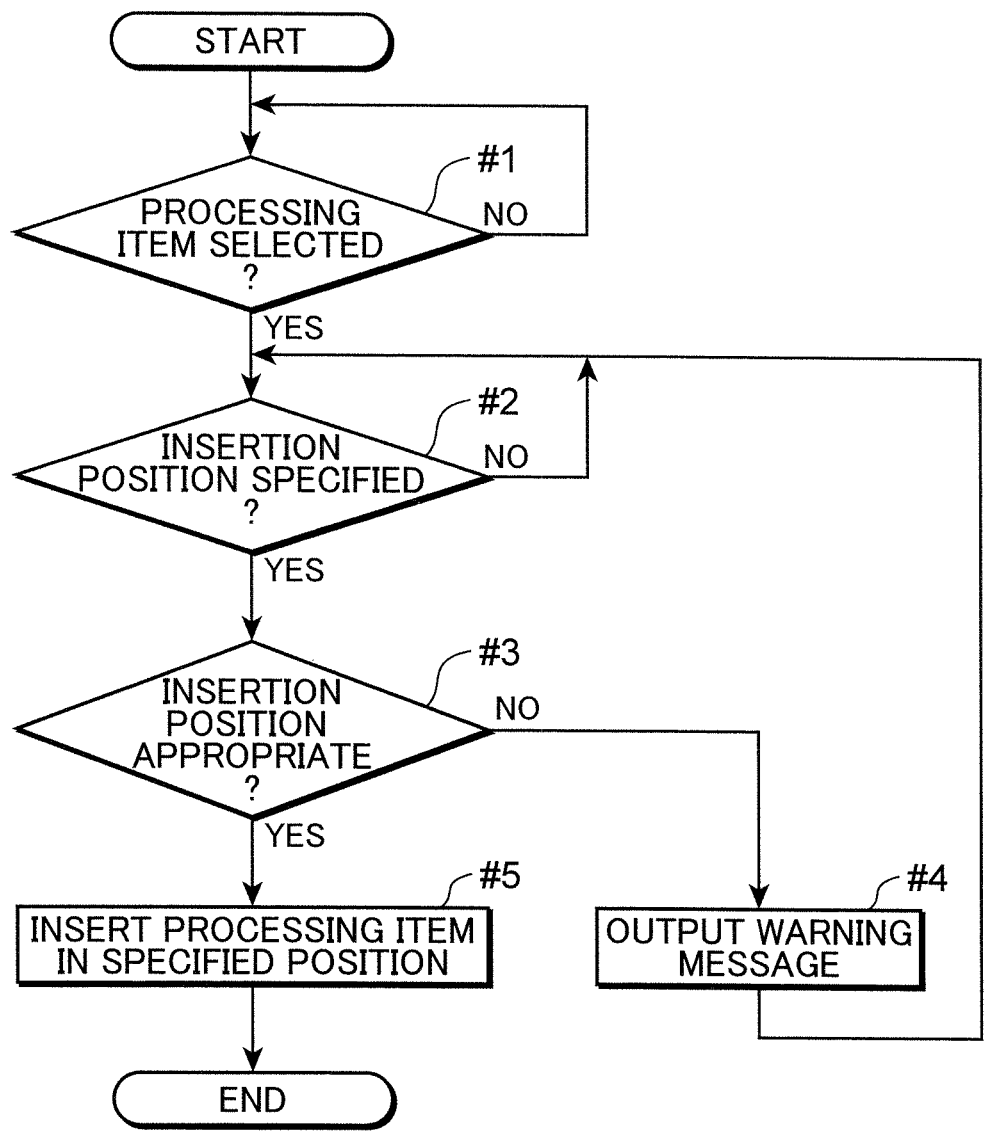
FIG. 7 is a flowchart showing processing by the control portion in a case where an operation is carried out of adding a processing item to a workflow in the customization screen.

Here, description is given of the processing of the control portion 51 during operation of the customization screen G. FIG. 7 is a flowchart showing processing by the control portion 51 in a case where an operation is carried out of adding a processing item to a workflow in the customization screen G.

As shown in FIG. 7, when any of the icons indicating operation screens of the processing items displayed in the second display region X2 in the customization screen G is selected (yes in step #1) and an insertion position for the icon indicating the operation screen of the processing item is specified by the icon being dragged and dropped to a desired position in the first display region X1 (yes in step #2), the determination portion 524 determines whether or not the insertion position is appropriate based on the table shown in FIG. 5 (whether or not the display order of the operation screens is in accordance with the display order prescribed by the table shown in FIG. 5 in a case where the operation screen indicated by an icon for which an insertion operation has been carried out is set in the display order corresponding to the insertion position) (step #3).

As a result, when the determination portion 524 determines that the insertion position is not appropriate (no in step #3), the display control portion 522 displays on the display portion 410 a warning message to the effect that the user operation cannot be accepted (step #4).

On the other hand, when the determination portion 524 determines that the insertion position is appropriate (yes in step #3), operational information indicating the operational content of the user is stored (step #5).

Returning to FIG. 4, when the reception processing for the customization operation using the customization screen G is finished by an "OK" button B1 being operated on the customization screen G, an input screen 4107 for the title of the generated workflow is displayed on the display portion 410. A keyboard screen 4107a or the like is displayed on the input screen 4107 to enable input of a workflow name from the user by using the touch panel function by the user pressing the keyboard image.

When a workflow name is inputted from the user by operation of the input screen 4107, the display control portion 522 displays on the display portion 410 a confirmation screen 4108 that is provided with images 4108a in which the processing items that have been received at the customization screen G are displayed lined up in a list, a register button 4108b for receiving instruction to register the processing items that are displayed in the list, and a settings change button 4108c for receiving instruction to change the contents of the settings that displayed in the list.

When the register button 4108b is pressed by the user during display of the confirmation screen 4108 and instruction is received at the instruction receiving portion 523 to register the contents of the settings that are listed and displayed, the control portion 51 stores the customized template in the storage portion 521. It should be noted that after this, the display control portion 522 displays on the display portion 410 a registration complete screen 4109 notifying the user of completion of registration.

Furthermore, when the settings change button 4108c is pressed by the user during display of the confirmation screen 4108 and a settings change instruction is received at the instruction receiving portion 523 to change the contents of the settings that are listed and displayed, the display control portion 522 returns to the process of again successively displaying on the display portion 410 the customization screens of the workflow indicated by the template received by the instruction receiving portion 523.

Figure 8:
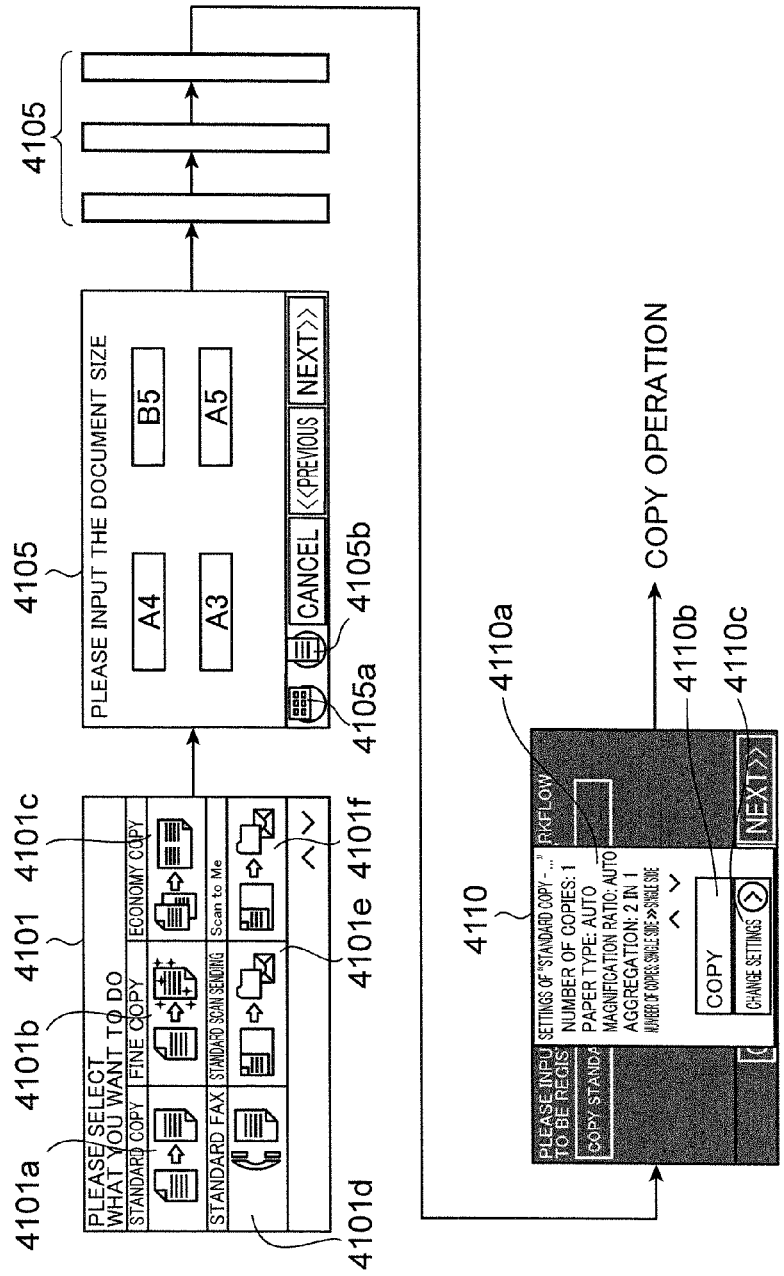
FIG. 8 is a diagram showing the transitions of display screens when a workflow is called up in regard to the copy function.

Next, description is given of processing when calling up a workflow in the multifunction machine 1. FIG. 8 is a diagram showing the transitions of display screens when a workflow is called up in regard to the copy function.

When the main power of the multifunction machine 1 is turned on by the user, the display control portion 522 displays on the display portion 410 the initial screen (omitted from the drawings) that is determined in advance.

When the workflow button 450 on the operation portion 400 is pressed by the user during the display of this initial screen and a workflow commencement instruction is received by the instruction receiving portion 523, the display control portion 522 displays a workflow screen 4101 (FIG. 8). Workflow images 4101a to 4101f indicating workflows stored (registered) in the storage portion 521 are displayed on the workflow screen 4101.

When any of the workflow images 4101a to 4101f displayed within the workflow screen 4101 is pressed by the user during display of the workflow screen 4101 and a workflow selection instruction is received from the user to select a workflow to be applied in regard to execution of a function (for example, the copy operation or the like) provided in the multifunction machine 1, the display control portion 522 reads out the selected workflow from the storage portion 521 and operation screens (for example the operation screen 4105 shown in FIG. 8) for the settings of functions indicated by the workflow that has been read out (for example, document size, number of copies, sheet size, magnification ratio, darkness, aggregate printing, document image quality, and double-sided division or the like in the case of the copy function) are successively displayed on the display portion 410.

Then, in a case where specification of content (for example, a specific number of number of copies or the like) is received in regard to the processing items for which guidance is being given on the operation screen by the touch panel function based on an operation by the user of the operations buttons or numeric keypad 433 displayed on the operation screen, the instruction receiving portion 523 set the settings content in the content (settings values) for which instruction has been given.

The display control portion 522 repeats the display processing of the operation screens and the reception processing of the settings content until the operation screens of all processing items are displayed for functions indicated by the template that has been read out. Then, when the reception processing of the settings content is completed at the operation screens of the processing items relating to document reading operations, the reading control portion 525 commences document reading operations from that time point in the document reading portion 500.

After this, when display processing of the operation screens and reception processing of the settings content is completed in regard to all the processing items, a confirmation screen 4110a is displayed on the display portion 410 provided with images in which the settings content received at that time point are displayed lined up in a list on the display portion 410, a function execution button (4110b in FIG. 8) for receiving a function execution instruction to execute the function according to the content of the settings displayed in the list, and a button (settings change button 4110c in FIG. 8) for receiving instruction to change the content of the settings displayed in the list. Then, when the function execution button 4110b is pressed and an instruction is received by the instruction receiving portion 523 to execute the function according to the content of the settings displayed in the list, the control portion 51 executes the function (the copy operation or the like) according to the content of the settings displayed in the list.

As described above, in the present embodiment, in a case where operation screens for setting content in regard to processing items in a wizard format display are displayed in a wizard format display, in regard to functions of the multifunction machine 1 including processing items relating to document reading operations and processing items relating to operations other than that, a display order is set in advance for the operation screens for each of the processing items such that the operation screens for the processing items relating to document reading operations are displayed prior to the operation screens for processing items relating to operations other than the document reading operations, and in a case where an operation of changing the template at the customization screen G (an operation of adding a processing item to the workflow or changing the order) does not correspond to the display order that has been set in advance, the operation of the user is not received and a warning message is outputted to the effect that the operation of the user cannot be received, and therefore even in a case where the user has carried out an inappropriate operation, a state can be reliably creating in which the setting and input of content (settings values) of processing items relating to document reading operations are carried out by the user prior to the setting and input of content (settings values) of processing items relating to operations other than document reading operations.

As a result, by commencing document reading operations at the time point when settings of content has been completed at the operation screens for processing items relating to document reading operations, the document reading operations can be carried out concurrent to the setting and input of content of processing items relating to operations other than the document reading operations, and compared to a case of carrying out the document reading operations and operations other than this after content of all processing items has been inputted, the time until the series of processing by the multifunction machine 1 is completed can be shortened.

For example, in the case of the conventional techniques described in the Description of the Background Art, there is no particular problem when the basic mode is used, but even in a case of using a mode that the user has arranged, for document reading to be carried out using initial settings (the settings values of basic mode) that have been stored in advance, inefficiency is produced in that the document data that has been read in under the basic mode becomes unnecessary or extra processing is carried out of changing the image data that has been read under basic mode to image data that has been read under the mode that has been arranged by the user, and a situation can occur in which extra processing time is required. However, with the present embodiment, this situation does not occur.

It should be noted that instead of the present embodiment, the present invention can be employed in modified embodiments such as the following in addition to the present embodiment.

In the above-described embodiment, when an inappropriate operation is carried out in the customization screen, the operation is not accepted and a warning message to the effect that the operation cannot be accepted is displayed on the display portion 410, but different processing such as the following can also be employed as the processing in a case where an inappropriate operation is carried out in the customization screen G.

Figure 9:
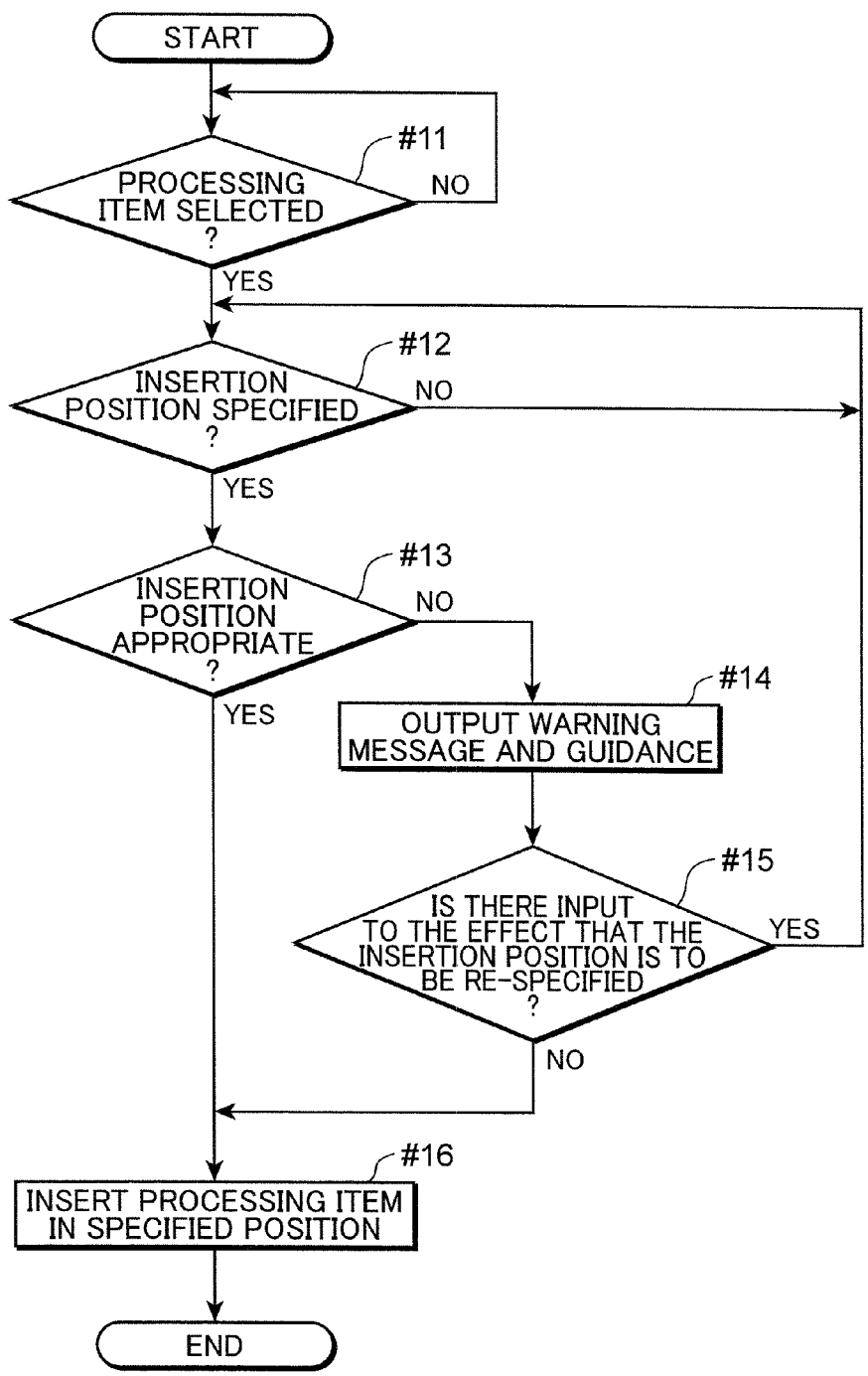
FIG. 9 is a flowchart showing a modified example of processing by the control portion when an operation is carried out of adding a processing item to a workflow in the customization screen.

FIG. 9 is a flowchart showing a modified example of processing by the control portion 51 when an operation is carried out of adding a processing item to a workflow in the customization screen G.

As shown in FIG. 9, when any of the icons indicating operation screens of the processing items displayed in the second display region X2 in the customization screen G is selected by the user (yes in step #11) and an insertion position of the operation screen of the processing item is specified by the icon being dragged and dropped to a desired position in the first display region X1 (yes in step #12), the determination portion 524 determines whether or not the insertion position is appropriate based on the table shown in FIG. 5 (whether or not the display order of the operation screens is in accordance with the display order prescribed by the table shown in FIG. 5 in a case where the operation screen indicated by an icon for which an insertion operation has been carried out is set in the display order corresponding to the insertion position) (step #13).

As a result, when the determination portion 524 determines that the insertion position is appropriate (yes in step #13), operational information indicating the operational content of the user is stored and the display control portion 522 displays an image of the state in which the icon of the processing item that was operated is inserted in the insertion position that was specified (step #16).

On the other hand, when the determination portion 524 determines that the insertion position is not appropriate (no in step #13), the display control portion 522 displays on the display portion 410 a warning message and guidance (step #14). Rather than giving indication to the effect that the operation of the user cannot be accepted as in the first embodiment, the warning message that is displayed here gives indication to the effect that the insertion position of the icon being operated is inappropriate, and the aforementioned guidance gives indication of an appropriate insertion position. As well as the warning message and guidance, the display control portion 522 carries out display of a button to enable the user to select whether or not to re-specify (change) the insertion position (step #15).

In a case where input is carried out to the effect that the insertion position is re-specified (yes in step #15), the control portion 51 returns to the processing of step #12, while in a case where input is carried out to the effect that the insertion position will not be re-specified (no in step #15), processing of step #16 is carried out.

In this way, in the present embodiment, rather than not accepting the operation when an inappropriate operation is carried out, notification is given to the effect that the operation is inappropriate and the user is prompted to redo the settings input in regard to the display order, and therefore, as much as possible, the operation screens can be displayed using the wizard format display in the display order of the operation screens corresponding to the content stored in the storage portion 521 while giving importance to the intentions of the user, and thus, as much as possible, a state can be created in which the operation screens of the processing items relating to document reading operations are displayed prior to the operation screens of processing items relating to operations other than document reading operations.

As a result, by commencing document reading operations at the time point when settings of content has been completed at the operation screens for processing items relating to document reading operations, the document reading operations can be carried out concurrent to the setting and input of content of processing items relating to operations other than the document reading operations, and compared to a case of carrying out the document reading operations and operations other than this after content of all processing items has been inputted, the time until the series of processing by the multi-function machine 1 is completed can be shortened.

Figure 10:
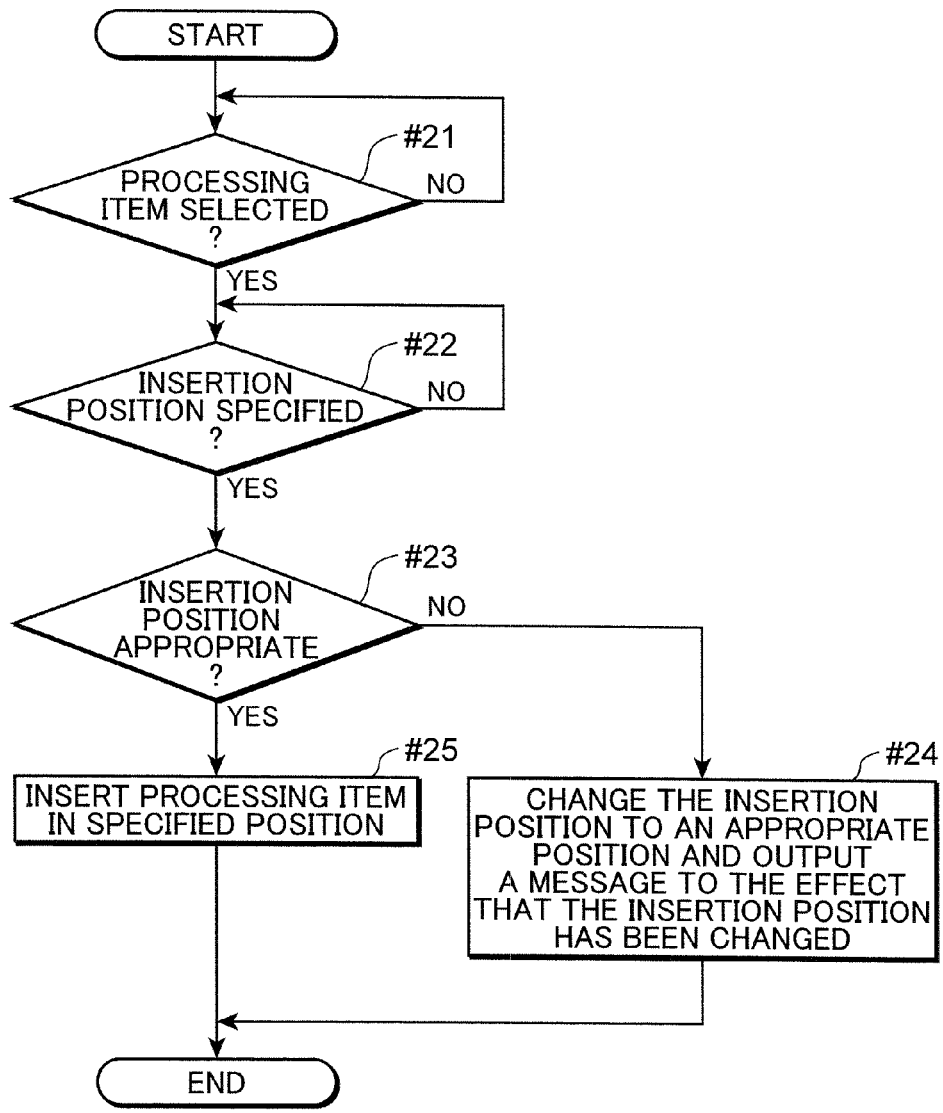
FIG. 10 is a flowchart showing another modified example of processing by the control portion when an operation is carried out of adding a processing item to a workflow in the customization screen.

In addition to this embodiment, processing such as the following can also be employed. FIG. 10 is a flowchart showing another modified example of processing by the control portion 51 when an operation is carried out of adding a processing item to a workflow in the customization screen G.

As shown in FIG. 10, when any of the icons indicating operation screens of the processing items displayed in the second display region X2 in the customization screen G is selected (yes in step #21) and an insertion position of the operation screen of the processing item is specified by the icon being dragged and dropped to a desired position in the first display region X1 (yes in step #22), the determination portion 524 determines whether or not the insertion position is appropriate based on the table shown in FIG. 5 (whether or not the display order of the operation screens is in accordance with the display order prescribed by the table shown in FIG. 5 in a case where the operation screen indicated by an icon for which an insertion operation has been carried out is set in the display order corresponding to the insertion position) (step #23).

As a result, when the determination portion 524 determines that the insertion position is appropriate (yes in step #23), operational information indicating the operational content of the user is stored and the display control portion 522 displays an image of the state in which the icon being operated is inserted in the insertion position that was specified (step #25).

On the other hand, when the determination portion 524 determines that the insertion position is not appropriate (no in step #23), the display control portion 522 changes the insertion position of the icon being operated to an appropriate position in accordance with the display order prescribed in the stored table, and the display control portion 522 displays on the display portion 410 a message to the effect that the insertion position of the icon being operated has been changed (step #24).

Figure 11:
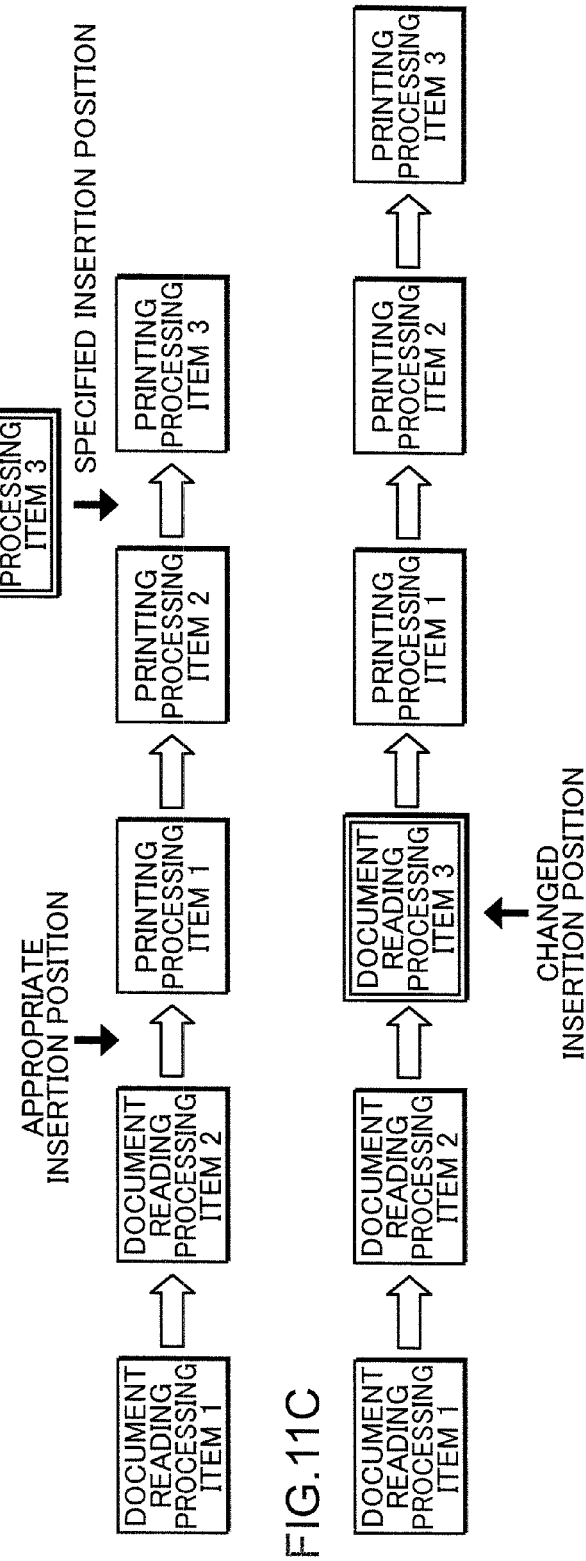
FIGS. 11A, 11B, and 11C are diagrams for describing processing in the flowchart shown in FIG. 10.

That is, suppose that the display order of the operation screens before customization of the workflow is carried out at the customization screen G is the operation screen of the processing item 1 relating to document reading operations→the operation screen of the processing item 2 relating to document reading operations→the operation screen of the processing item 1 relating to printing operations→the operation screen of the processing item 2 relating to printing operations→the operation screen of the processing item 3 relating to printing operations as shown in FIG. 11A.

In this case, suppose that the user attempts to add the operation screen of the processing item 3 relating to document reading operations to the workflow in a form inserted between the operation screen of the processing item 2 relating to printing operations and the operation screen of the processing item 3 relating to printing operations as shown in FIG. 11B for example.

And in a case where the display order of processing items relating to document reading operations is set higher than the display order of processing items unrelated to document reading operations as described above in the table stored by the determination portion 524, and the display order of the operation screen of the processing item 3 relating to document reading operations is set after the operation screen of the processing item 2 relating to document reading operations, the determination portion 524 determines that the operation screen of the processing item 3 relating to document reading operations should be inserted between the operation screen of the processing item 2 relating to document reading operations and the operation screen of the processing item 1 relating to printing operations as shown in FIG. 11C, and the workflow of this inserted state is stored.

Furthermore, the display control portion 522 displays an image indicating the state in which the operation screen of the processing item 3 relating to document reading operations is inserted between the operation screen of the processing item 2 relating to document reading operations and the operation screen of the processing item 1 relating to printing operations as shown in FIG. 11C for example.

In this way, in the present embodiment, in a case where an inappropriate operation has been carried out, instead of merely rejecting that operation, the insertion position of the operation screen indicated by the icon being operated is (automatically) changed by the multifunction machine 1 so that the document reading operations are reliably executed before other operations (operations other than the reading operations).

In this embodiment, by commencing document reading operations at the time point when settings of content (settings values) has been completed at the operation screens for processing items relating to document reading operations, the document reading operations can be carried out concurrent to the setting and input of content of processing items relating to operations other than the document reading operations, and compared to a case of carrying out the document reading operations and operations other than this after content of all processing items has been inputted, the time until the series of processing by the multifunction machine 1 is completed can be shortened, and it becomes unnecessary to carry out resetting and inputting the display order of the operation screens by the user and the burden of tasks performed by the user can be reduced as much as possible.

Figure 12:
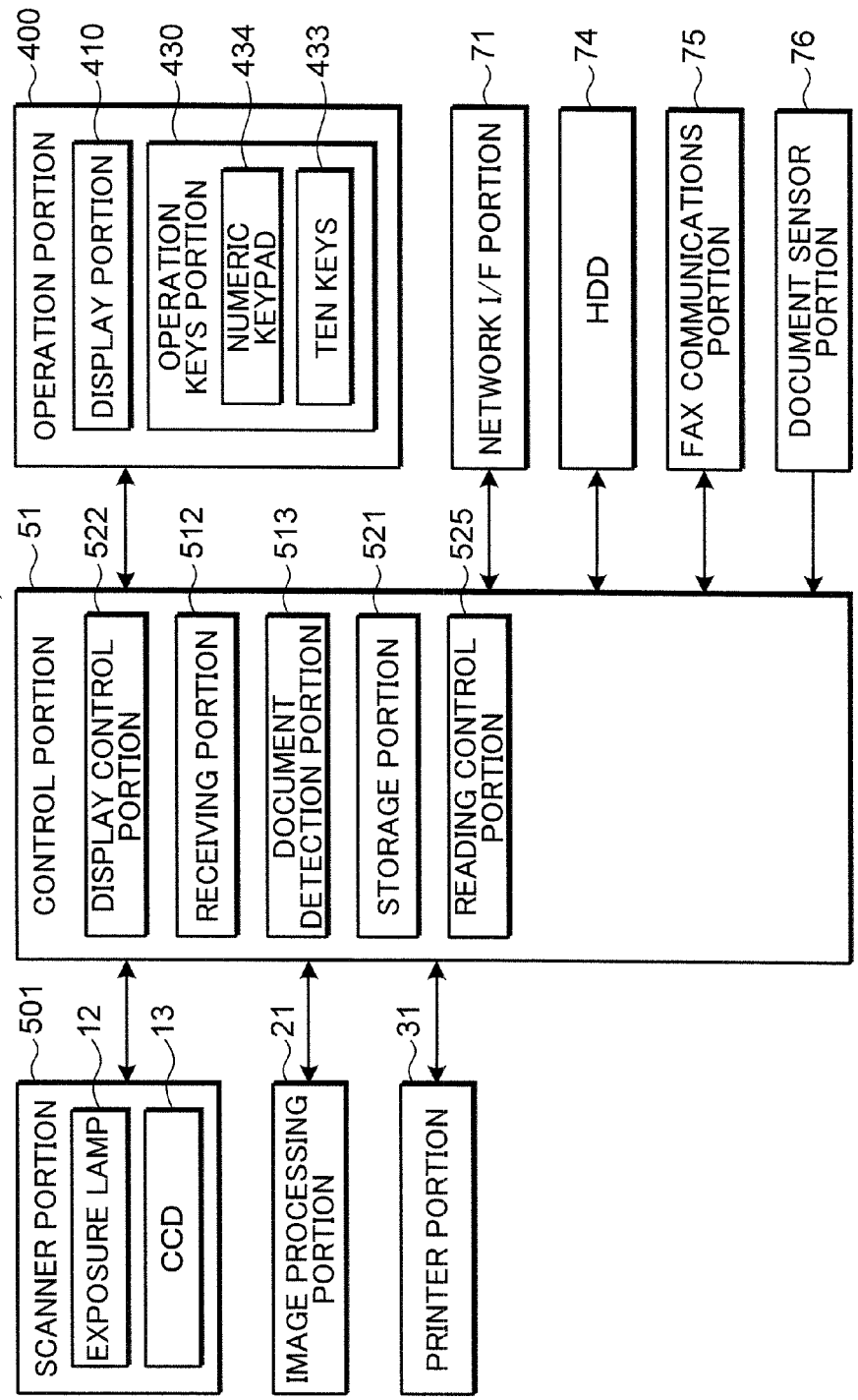
FIG. 12 is a control block diagram of the multifunction machine 1 according to this other embodiment.

Next, description is given regarding another embodiment of an image forming apparatus, a control device, and a reading device according to the present invention. FIG. 12 is a control block diagram of the multifunction machine 1 according to this other embodiment. It should be noted that description is omitted of same configurations as the configuration shown in FIG. 3.

The control portion 51 of the multifunction machine 1 as an image forming apparatus according to this other embodiment functions as the display control portion 522, the reception portion 512, a document detection portion 513, the storage portion 521, and the reading control portion 525 in accordance with an image processing program for the CPU to execute the present embodiment stored in a ROM or the like.

It should be noted that components such as the start key 432, the numeric keypad 433, and the function switching keys 434 shown in FIG. 2 are provided on the operational key portion 430. The control portion 51 receives instructions inputted by the operator from the display portion 410 and the keys of the operational key portion 430.

A document sensor portion 76 is a component detecting whether or not a document has been set in the document loading portion 601. The document sensor portion 76 is constituted by a pair of light launching/receiving devices for example, and when a document is set in the document loading portion 601, the light outputted from the light launching device is reflected by the document and the reflected light is received by the light receiving device. The document sensor portion 76 outputs to the control portion 51 an H (high) signal when reflected light is received by the light receiving device, and outputs an L (low) signal at times other than this.

When the setting and input of settings values is carried out using the operation screens, the reception portion 512 (the third reception portion) carries out a process of receiving the settings input of the settings values.

Here, in this other embodiment, in a case where a series of operations is to be executed including document reading operations and operations other than this, the display control portion 522 displays the aforementioned first type operation screen on the display portion 410 prior to the second type operation screen. In this way, the settings values of settings items relating to document reading operations can be set and inputted prior to the settings values of processing items unrelated to the reading operations.

For example, in the case of the copy mode, a document reading operation and an operation of image forming onto the paper are executed as a series of operations. At this time, there are reading darkness a document resolution by the document reading portion 500 for example as settings items relating to document reading operations, and on the other hand there are paper size and paper type for example as settings items relating to image forming operations.

In a case where the image forming apparatus 1 is now to execute duplication (copying) of a paper, four settings items, these being the aforementioned "darkness of reading," "reading resolution," "paper size," and "paper type," are determined as settings items for which settings values are to be inputted by the user. Furthermore, as shown in FIG. 13, a operation screen (one example of the second type operation screen) G1 is provided for the settings item of the document size, a operation screen (one example of the first type operation screen) G2 is provided for the settings item of the reading resolution, a operation screen (one example of the second type operation screen) G3 is provided for the settings item of the paper type, and a operation screen (one example of the first type operation screen) G4 is provided for the settings item of the darkness of reading.

At this time, as shown in FIGS. 14A and 14B, the display control portion 522 displays the operation screens G2 and G4 for the darkness of reading and the reading resolution relating to the document reading operations on the display portion 410 prior to the operation screens G1 and G3 for the paper size and paper type relating to the image forming operations.

It should be noted that FIG. 14A indicates that the display control portion 522 displays the operation screen (operation screen) G2 for the reading resolution, the operation screen (operation screen) G4 for the darkness of reading, the operation screen (operation screen) G1 for the settings item of the paper size, and the operation screen (operation screen) G3 for the paper type on the display portion 410 in this order.

Furthermore, FIG. 14B indicates that the display control portion 522 displays the operation screen (operation screen) G4 for the darkness of reading, the operation screen (operation screen) G2 for the reading resolution, the operation screen (operation screen) G3 for the paper type, and the operation screen (operation screen) G1 for the settings item of the paper size on the display portion 410 in this order.

Returning to FIG. 12, the document detection portion 513 detects whether or not a document has been set in the document loading portion 601 based on the output signal of the document sensor portion 76. The document detection portion 513 determines that a document is set in the document loading portion 601 when an H (high) signal is received from the document sensor portion 76, and determines that no document is set in the document loading portion 601 when an L (low) signal is received from the document sensor portion 76.

The storage portion 521 further stores in advance in relation to the settings items in the image forming apparatus 1 such as the aforementioned darkness of reading and paper size, a presence/absence of relationship to document reading operations, and an allow/prohibit for precedent commencement of document reading operations. FIG. 15A shows a table indicating a correspondence relationship between settings items in the case of the copy mode, the presence/absence of relationship to document reading operations in regard to these settings items, and the allow/prohibit for precedent commencement of document reading operations, and FIG. 15B shows a table indicating a correspondence relationship between settings items in the case of the scanner mode and sending an image that has been read to an external device by email, the presence/absence of relationship to document reading operations in regard to these settings items, and the allow/prohibit for precedent commencement of document reading operations. It should be noted that in FIGS. 15A and 15B, a case where there is a relationship to document reading operations in regard to the settings items is expressed as "necessary," and a case where there is no relationship is expressed as "unnecessary."

The reading control portion 525 controls reading operations by the document reading portion 500, and in particular, in the present embodiment, in a case where a series of operations including document reading operations and operations other than this is to be executed, the reading control portion 525 determines whether or not predetermined conditions, which are described later, are satisfied at the time point when input of all settings values has been received by the reception portion 512 in regard to settings items relating to document reading operations, and in a case where the predetermined conditions are satisfied, it induces precedent commencement of reading operations by the document reading portion 500 even if all the input of settings values of settings items has not been completed relating to operations anticipated to be executed this time in the image forming apparatus 1.

For example, when input of the settings value of the darkness of reading is received by the reception portion 512 at the operation screen G4 in regard to the darkness of reading in the example shown in FIG. 14A, or when input of the settings value of the reading resolution is received by the reception portion 512 at the operation screen G2 in regard to the reading resolution in the example shown in FIG. 14B, the reading control portion 525 determines whether or not the predetermined condition is satisfied, and induces precedent commencement of reading operations by the document reading portion 500 in a case where the predetermined condition is satisfied.

In the present embodiment, the predetermined condition refers to the following three conditions. One is that the document detection portion 513 determines that a document has been set in the document loading portion 601. And another is that the operation anticipated to be executed this time on the image forming apparatus 1 is linked to a task of the user, for example the reading object is a book, and the operation of the image forming apparatus 1 based on the settings values that have been set and inputted using the first type operation screen for processing items relating to document reading operations is not an operation that is carried out while linked to the predetermined task of the user such as an operation of duplicating an image of each page while the user turns the pages of the book. And another is that user agreement is obtained in regard to performing precedent commencement of document reading operations.

It should be noted that satisfying the aforementioned three conditions is set in the present embodiment as a condition for precedent commencement of document reading operations, but the present case is not limited to a case in which all three conditions are satisfied as conditions for precedent commencement of document reading operations, and the contents of the conditions are not limited to the aforementioned conditions and may be set as appropriate.

To obtain the agreement, the display control portion 522 displays on the display portion 410 an operation screen for inputting an instruction as to whether or not precedent commencement of document reading operations may be performed.

When the document detection portion 513 determines that no document is set in the document loading portion 601 at a time point when the settings values of the settings items relating to document reading operations have been inputted, the reading control portion 525 causes the display control portion 522 to carry out processing in which notification is given to the effect that no document is set in the document loading portion 601, and stands by until it is determined by the document detection portion 513 that a document has been set in the document loading portion 601.

Furthermore, in a case where the settings values inputted at the first type operation screen indicate an operation to be carried out linked to a task of the user, the reading control portion 525 cancels precedent commencement of document reading operations and induces document reading operations to commence in the document reading portion 500 once the settings input of the settings values have been completed for all settings items.

FIG. 16 and FIG. 17 are flowcharts of the other embodiment showing a series of processing by the control portion 51. It should be noted a circumstance is supposed here in which the user carries out a copy (duplication) operation in the image forming apparatus 1.

As shown in FIG. 16, when the display control portion 522 displays on the display portion 410 an operation screen for setting and inputting settings values of processing items relating to a copy (duplication) operation in the image forming apparatus 1 (step #31), the reception portion 512 determines whether or not the setting and inputting of settings values of the settings item in this operation screen has been received (step #32), and when the setting and input of the settings values has been received (yes in step #32), a determination is performed as to whether or not all the settings input necessary for document reading operations have been received (step #33).

When the reception portion 512 determines that all the settings input necessary for document reading operations have not been received (no in step #33), the display control portion 522 displays the next operation screen on the display portion 410 (step #34), and when the reception portion 512 determines that all the settings input necessary for document reading operations have been received (yes in step #33), the reading control portion 525 determines whether or not the document reading operations are to be carried out linked to a user task (required a user task) (step #35).

When the reading control portion 525 determines that the document reading operations are not to be carried out linked to a user operation (no in step #35), the display control portion 522 displays on the display portion 410 an operation screen for inputting an instruction as to whether or not precedent commencement of document reading operations may be performed (step #36), and when an instruction is received by the reception portion 512 to the effect that precedent commencement of document reading operations may be performed (yes in step #36), the reading control portion 525 references the determination result as to whether or not it has been determined by the document detection portion 513 that a document is set in the document loading portion 601 (step #37).

As a result, when the reading control portion 525 determines according to the document detection portion 513 that no document is set in the document loading portion 601 (no in step #37), the display control portion 522 outputs a message to that effect on the display portion 410 (step #38), while on the other hand when it is determined according to the document detection portion 513 that a document is set in the document loading portion 601 (yes in step #37), the reading control portion 525 causes document reading operations to commence in the document reading portion 500, and the display control portion 522 displays on the display portion 410 the next operation screen (second type operation screen) (step #39).

After this, as shown in FIG. 17, the display control portion 522 determines whether or not an operation has been carried out in which settings values of settings items have been set and inputted in the operation screen displayed on the display portion 410 (step #40), and when an operation is carried out (yes in step #40), the reception portion 512 determines whether or not all the settings input necessary for the duplication operation have been received (step #41).

When the reception portion 512 determines that all the settings input necessary for the duplication operation have not been received (no in step #41), the display control portion 522 displays the next operation screen on the display portion 410 (step #42) and the procedure returns to the process of step #40, and when the reception portion 512 determines that all the settings input necessary for duplication operations have been received (yes in step #41), the control portion 51 causes image forming operations to be carried out in the image forming portion 33 (step #43).

It should be noted that in a case where the reading control portion 525 determines in step #35 that the document reading operation is to be carried out linked to a user task (yes in step #35) and the reception portion 512 receives in step #36 an instruction to the effect that precedent commencement of document reading operations is prohibited (no in step #36), the reception portion 512 determines whether or not all the settings input necessary for the duplication operations have been received (step #44).

When the reception portion 512 determines that all the settings input necessary for the duplication operations have not been received (no in step #44), the display control portion 522 displays the next operation screen on the display portion 410 (step #45), and when the settings input of the settings values of settings items have been received in the operation screen (step #46), the procedure returns to step #44.

When the reception portion 512 determines that all the settings input necessary for the duplication operation have been received (yes in step #44), the control portion 51 executes the duplication operation in the portions of the image forming apparatus 1 (step #47).

In this way, the present embodiment is configured such that in a case where a series of operations is to be executed including document reading operations and operations other than this (for example, image forming operations), first type operation screen for setting and inputting settings values of settings items relating to document reading operations is displayed on the display portion 410 prior to second type operation screen for setting and inputting settings values of settings items unrelated to document reading operations, and settings values of settings items relating to document reading operations are set and input prior to settings values of settings items unrelated to document reading operations.

Furthermore, in a case where the predetermined condition is satisfied, precedent commencement of document reading operations by the document reading portion 500 are carried out at the time point when settings values of all settings items relating to document reading operations have been inputted, even if the settings values of settings items related to operations other than document reading operations have not been inputted.

In this way, document reading operations can be carried out concurrent to the input of settings values of settings items relating to image forming operations, and compared to carrying out document reading operations and image forming operations after all the settings values of settings items have been inputted, the time until processing of the series of processing by the image forming apparatus 1 is completed can be shortened.

Furthermore, supposing precedent commencement of document reading operations is executed in a case where the document reading operations are to be carried out linked to a user task, the document reading operations by the document reading portion 500 will be interrupted midway when the predetermined task becomes required during the reading operations, but at this time the user may carry out input operations of settings values of the remaining settings items (settings items to be set in the second type operation screen), and in this case it is necessary to interrupt the input operation to carry out the predetermined task. It is necessary for the user to remember which step the input operation of settings values has proceed to when carrying the predetermined task, and in a case where the user does not remember, there may be confusion in restarting input operations of the settings values.

In contrast to this, in the present embodiment, even in a case where operations to be carried out by the image forming apparatus 1 include operations other than document reading operations, the above-described document reading operations do not undergo precedent commencement when the document reading operations are to be carried out linked to the user task, and therefore occurrences of the aforementioned situation can be avoided. However, the present case is not necessarily configured such that precedent commencement of document reading operations is not performed in a case where the document reading operations are to be carried out linked to a user task.

Furthermore, suppose that there is a configuration in which precedent commencement of document reading operations is carried out without user permission, then the document reading operations will commence automatically (without permission) midway in the series of operations, and a user who is unaware of how precedent commencement of document reading operations works will unintentionally commence the document reading operations, and this user will be unable to confirm a reason for reading operations commencing and will terminate input of settings values for the remaining settings items and stand by until the reading operation has finished, or reset the inputted content and re-input the settings values.

In contrast to this, in the present embodiment, user agreement is obtained in regard to precedent commencement of the document reading operations, and precedent commencement of document reading operations is performed when agreement is obtained, and therefore occurrences of the aforementioned situation can be avoided. However, the present case is not necessarily configured such that user agreement is obtained in regard to precedent commencement of document reading operations, and also includes embodiments in which the precedent commencement of document reading operations is performed without obtaining user agreement.

Furthermore, in a case where a document is not set in the document loading portion 601 when performing precedent commencement of document reading operations, notification is given to that effect, after which the precedent commencement of document reading operations is performed when a document is set in the document loading portion 601, and therefore the precedent commencement of document reading operations can be executed by causing the user to load a document into the document loading portion 601 even in a case where the use has forgotten to load a document into the document loading portion 601. However, embodiments that do not include a configuration in which in a case where a document is not set in the document loading portion 601, notification is given to that effect, after which the precedent commencement of document reading operations is performed when a document is set in the document loading portion 601 are also included within the scope of the present case.

It should be noted that the present invention is not limited to the configuration of the present embodiment and that various modifications are possible. The configurations and processes shown in the foregoing FIGS. 1 to 17 are merely illustrative examples of embodiments of the present invention and do not suggest that the present invention is limited to these embodiments.

Furthermore, for example, description was given in the foregoing embodiments in which the multifunction machine 1 was given as the image forming apparatus according to the present invention, but the image forming apparatus according to the present invention is not limited to a multifunction machine and includes other image forming apparatuses (such as copying machines, fax machines, scanner devices, and printers or the like).

This application is based on Japanese Patent application serial Nos. 2010-015356 and 2010-019249 filed in Japan Patent Office on Jan. 27, 2010 and Jan. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An image forming apparatus, comprising:
a display portion;
a document reading portion; and
a control device, the control device including:
  a storage portion that stores display data for a first type operation screen for setting and inputting settings values regarding settings items relating to document reading operations of the document reading portion, and display data for a second type operation screen for setting and inputting settings values regarding processing items unrelated to document reading operations by the document reading portion, and
  a display control portion that executes display control that causes the display portion to successively switch and display, in a wizard format, operation screens for setting the setting values regarding processing items in the image forming apparatus in use of display data for the first type operation screen and display data for the second type operation screen stored in the storage portion, wherein
  the display control portion displays, on the display portion, respective operation screens to be the first type operation screen prior to respective operation screens to be the second type operation screen when successively switching and displaying respective operation screens to be the first type operation screen and respective operation screens to be the second type operation screen on the display portion in the wizard format as the display control, the control device further including:

a second reception portion that receives settings input of settings values using operation screens successively switched and displayed in a display portion in a wizard format display in accordance with the display control, and a reading control portion that induces precedent commencement of the document reading operations to be carried out by the document reading portion at a time point when settings input of the settings values have been received by the second reception portion in regard to all processing items relating to document reading operations by the document reading portion, wherein the second reception portion receives settings input of settings and values regarding processing items unrelated to document reading operations concurrently with the document reading operations carried out by the document reading portion, the control device further including a display order storage portion, a first reception portion, a determination portion and a notification portion to customize display order of respective operation screens that are successively switched and displayed in the wizard format, the display order storage portion stores in advance a display order that is set in advance as a prescribed display order so that a display order for a first type operation screen is higher than a second type operation screen in a display order during the wizard format display of operation screens including the first type operation screen and the second type operation screen, the first reception portion receives settings input regarding the display order during the wizard format display of operation screens including the first type operation screen and the second type operation screen, the determination portion determines whether or not the display order of operation screens received by the first reception portion corresponds to the prescribed display order stored in the display order storage portion, and carries out a process of saving information indicating the display order of operation screens received by the first reception portion when the display order of operation screens received by the first reception portion is determined to correspond to the prescribed display order stored in the display order storage portion, and not to save information indicating the display order of operation screens received by the first reception portion when the display order of operation screens received by the first reception portion is determined not to correspond to the prescribed display order stored in the display order storage portion, and the notification portion carries out notification so that the display order of operation screens received by the first reception portion is refused when the determination portion determines that the display order of operation screens received by the first reception portion does not correspond to the prescribed display order stored in the display order storage portion, wherein the display control portion executes the display control in accordance with the display order of the respective operation screens stored by the determination portion.

2. The image forming apparatus according to claim 1, wherein in a case where the notification portion has carried out notification to an effect that the display order of operation screens received by the first reception portion is not appropriate, the first reception portion receives a necessary/unnecessary instruction of resetting input in regard to the display order, and the determination portion, when input has been received by the first reception portion to an effect that the resetting and input are unnecessary, carries out a process of storing information indicating the display order of operation screens received by the first reception portion, and when input has been received by the first reception portion to an effect that the resetting and input are necessary, causes the first reception portion to receive the resetting input.

3. The image forming apparatus according to claim 1, wherein when the determination portion has determined that the display order of operation screens received by the first reception portion does not correspond to the prescribed display order stored in the display order storage portion, the notification portion carries out notification to an effect that the display order of operation screens received by the first reception portion is not appropriate, and the determination portion carries out a process of changing the display order of operation screens received by the first reception portion so as to correspond to the prescribed display order stored in the display order storage portion, and the display control portion causes the display portion to display the operation screens in a wizard format display in accordance with the display order of the operation screens stored by the determination portion or in accordance with the display order of the operation screens that has been changed by the determination portion.

4. The image forming apparatus according to claim 1, wherein the reading control portion does not induce precedent commencement of the document reading operations to be carried out by the document reading portion in a case where the document reading operations are to be carried out linked to a predetermined task of a user according to settings values that have been set and inputted using the first type operation screen.

5. The image apparatus according to claim 1, wherein the display control portion displays on the display portion an operation screen for inputting an instruction of whether or not precedent commencement of document reading operations is permitted when settings input of the settings values using the first type operation screen is received by the second reception portion, and the reading control portion induces precedent commencement of the document reading operations to be carried out by the document reading portion in a case where an instruction has been received by the second reception portion to an effect that precedent commencement of document reading operations is permitted.

6. The image forming apparatus according to claim 1, further comprising:

a document loading portion that loads documents subjected to reading operations of the document reading portion, and a document detection portion that detects a presence/absence of a document in the document loading portion, wherein in a case where the reading control portion induces precedent commencement of the document reading operations to be carried out by the document reading portion, the display control portion outputs a message to an effect that no document is loaded in the document loading portion when a document is not detected by the document detection portion, and in a case where precedent commencement of the document reading operations is induced to be carried out by the document reading portion, the reading control portion induces precedent commencement of the document reading operations by the document reading portion to stand by when a document is not detected by the document detection portion, and induces precedent commencement of the document reading operations to be carried out by the document reading portion when a document is detected by the document detection portion after output of a message by the display control portion.

\* \* \* \* \*